(12) United States Patent
Anchan

(10) Patent No.: US 8,654,686 B2
(45) Date of Patent: Feb. 18, 2014

(54) GROUP COMMUNICATION SESSIONS THAT ARE AT LEAST PARTIALLY SUPPORTED OVER PERSONAL AREA NETWORKS IN A WIRELESS COMMUNICATIONS SYSTEM

(75) Inventor: Kirankumar Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 13/108,245

(22) Filed: May 16, 2011

(65) Prior Publication Data

US 2012/0294199 A1 Nov. 22, 2012

(51) Int. Cl.
*H04B 7/14* (2006.01)
*H04W 36/00* (2009.01)

(52) U.S. Cl.
USPC ........... 370/279; 370/293; 370/294; 370/295; 370/296; 370/310.2; 370/312; 370/315; 370/320; 370/328; 370/331; 455/436; 455/437; 455/438; 455/439; 455/440; 455/441; 455/442; 455/443; 455/444

(58) Field of Classification Search
USPC .............. 370/255, 279, 293–296, 310.2, 312, 370/315, 320, 328, 331; 455/436–444
See application file for complete search history.

(56) References Cited

U.S. PATENT DOCUMENTS

| | | | |
|---|---|---|---|
| 7,668,124 B2 | 2/2010 | Karaoguz | |
| 7,685,288 B2 | 3/2010 | Kakivaya et al. | |
| 7,756,538 B2 | 7/2010 | Bonta et al. | |
| 2005/0201301 A1 | 9/2005 | Bridgelall | |
| 2005/0201348 A1* | 9/2005 | Chitrapu et al. | 370/338 |
| 2006/0291419 A1* | 12/2006 | McConnell et al. | 370/331 |
| 2007/0008925 A1* | 1/2007 | Dravida et al. | 370/331 |
| 2009/0271519 A1 | 10/2009 | Helvick | |
| 2010/0063867 A1* | 3/2010 | Proctor et al. | 705/10 |
| 2012/0294199 A1* | 11/2012 | Anchan | 370/277 |

* cited by examiner

*Primary Examiner* — Benjamin H Elliott, IV
(74) *Attorney, Agent, or Firm* — Raphael Freiwirth

(57) ABSTRACT

In an embodiment, an application server receives a request to initiate a group communication session (GCS) over a Wireless Wide Area Network (WWAN) with a communication group. The application server obtains location information of a set of devices participating in the GCS and determines that the GCS can be supported between the set of devices via a Personal Area Network (PAN), after which the application server transitions support for the GCS from the WWAN to the PAN. In another embodiment, an originator begins a periodic broadcast of a local PAN signal announcing the GCS after failing to set-up the GCS via the WWAN. Target device(s) in the communication group receive the local PAN signal, determine not to transmit their own local PAN signal and then convey a session acceptance message to the originator. The GCS is then established between the target device(s) and the originator over the PAN.

46 Claims, 19 Drawing Sheets

US 8,654,686 B2

GROUP COMMUNICATION SESSIONS THAT ARE AT LEAST PARTIALLY SUPPORTED OVER PERSONAL AREA NETWORKS IN A WIRELESS COMMUNICATIONS SYSTEM

BACKGROUND

1. Field of the Invention

Embodiments of the invention relate to group communication sessions that are at least partially supported over personal area networks (PANs) in a wireless communications system.

2. Relevant Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

Wireless repeaters can be positioned within wireless communication systems in order to extend the range or coverage area of one or more Node Bs. In the uplink direction, the wireless repeaters receive signals from UEs and retransmit the received signals to a given Node B. In the downlink direction, the wireless repeaters receive signals from the given Node B and retransmit the received signals to UEs.

SUMMARY

In an embodiment, an application server receives a request to initiate a group communication session (GCS) over a Wireless Wide Area Network (WWAN) with a communication group. The application server obtains location information of a set of devices participating in the GCS and determines that the GCS can be supported between the set of devices via a Personal Area Network (PAN), after which the application server transitions support for the GCS from the WWAN to the PAN. In another embodiment, an originator begins a periodic broadcast of a local PAN signal announcing the GCS after failing to set-up the GCS via the WWAN. Target device(s) in the communication group receive the local PAN signal, determine not to transmit their own local PAN signal and then convey a session acceptance message to the originator. The GCS is then established between the target device(s) and the originator over the PAN.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
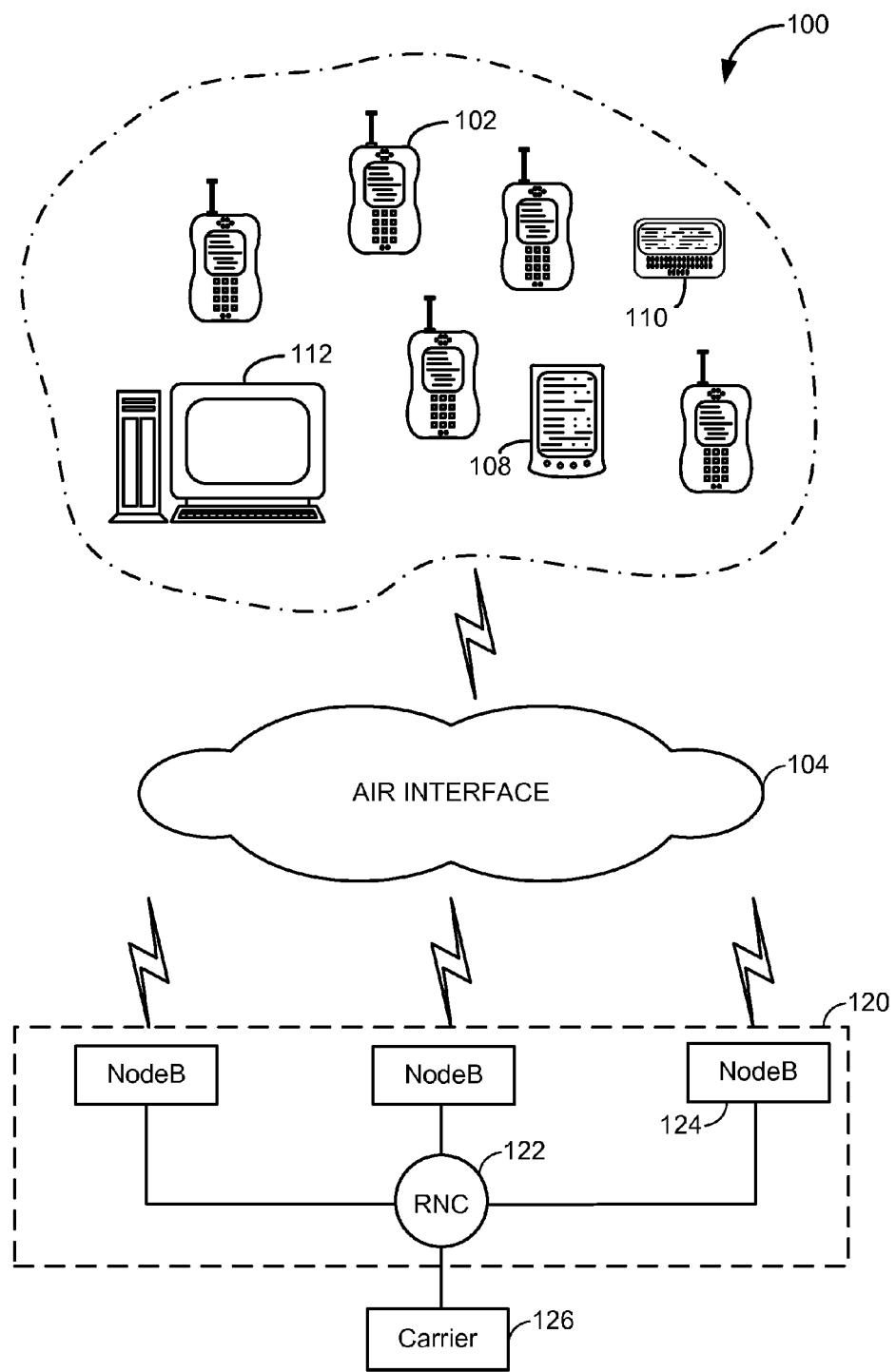
FIG. 1 is a diagram of a wireless network architecture that supports access terminals and access networks in accordance with at least one embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as a user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
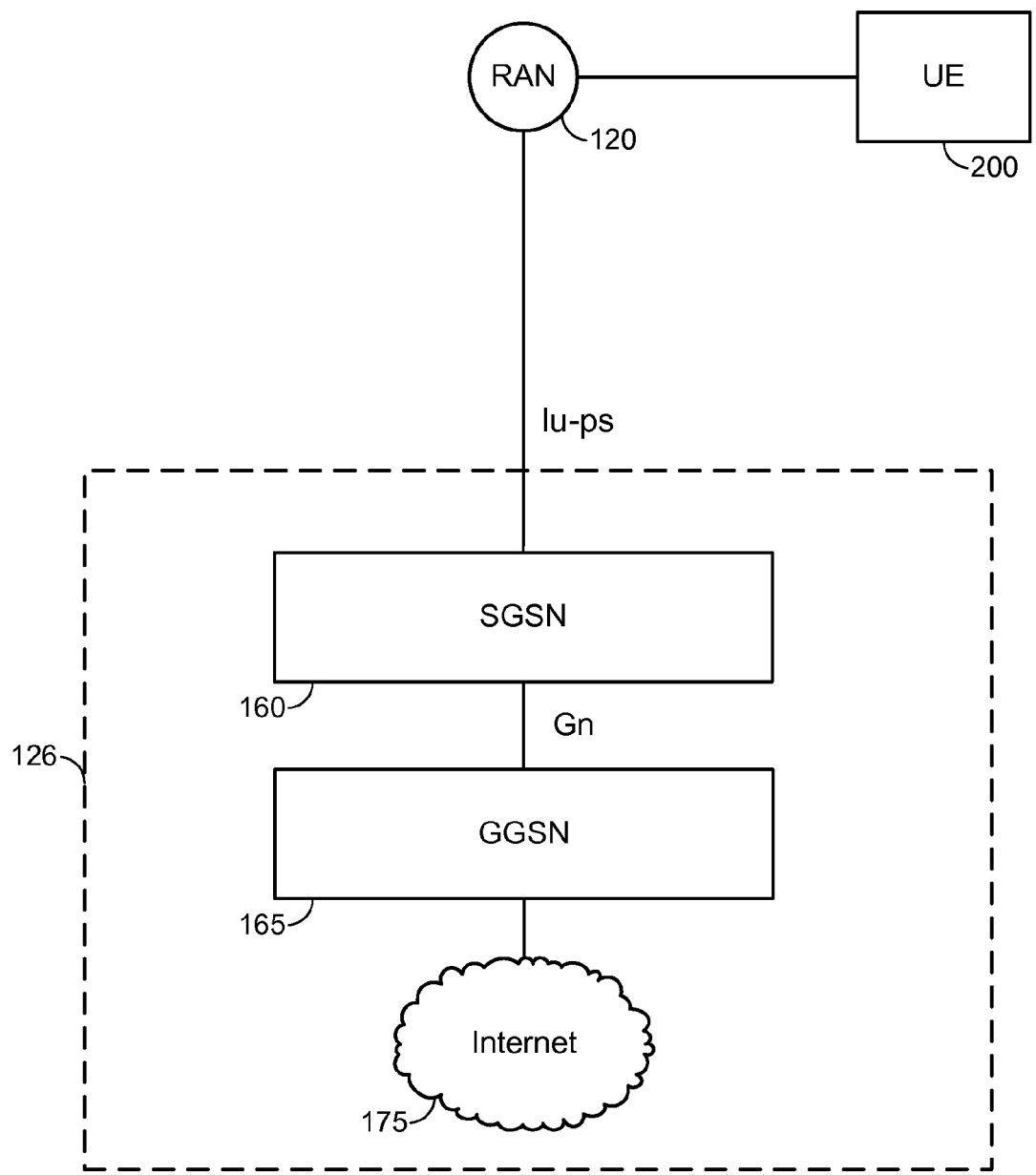
FIG. 2A illustrates the core network of FIG. 1 according to an embodiment.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
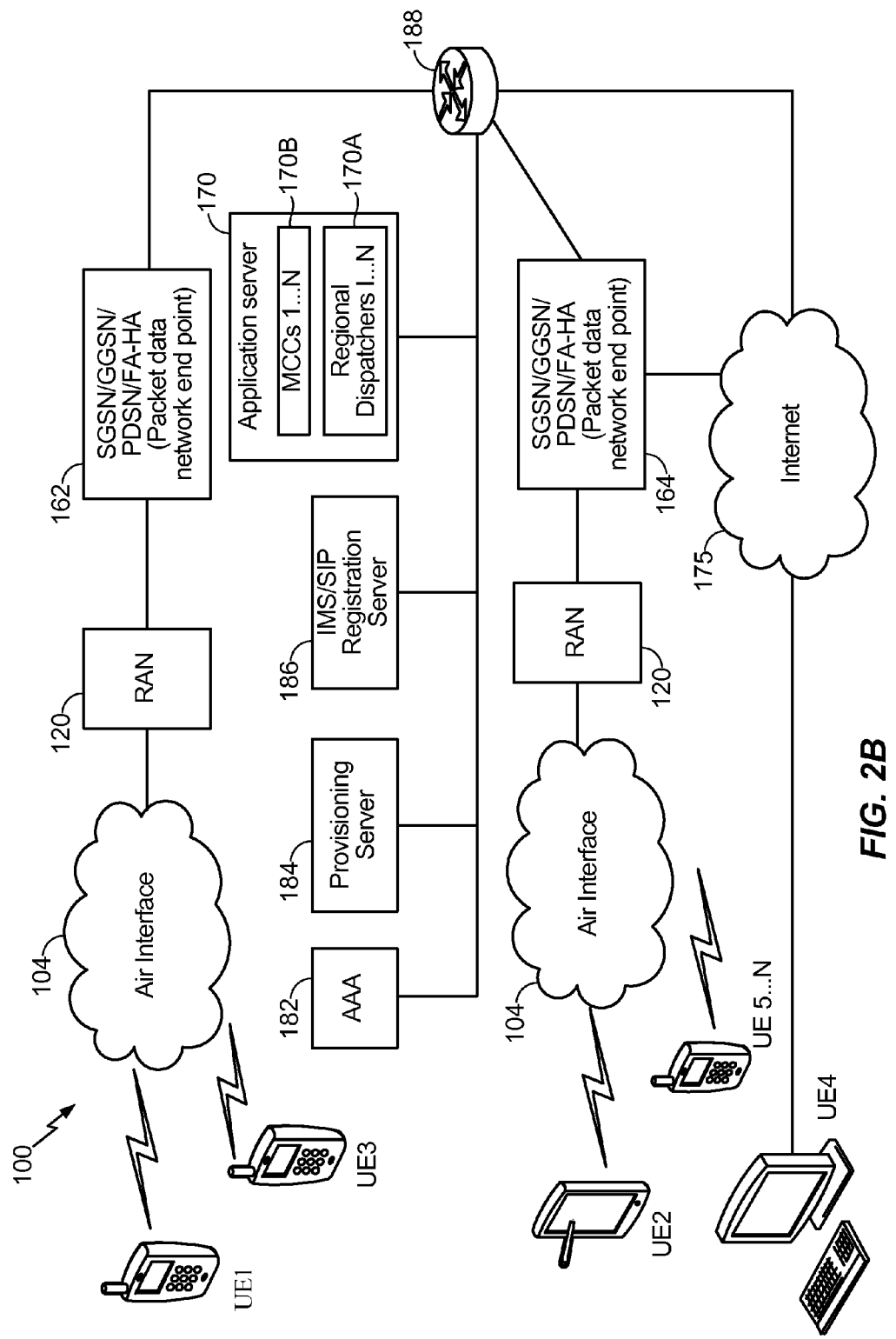
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 ... N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA server 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3A:
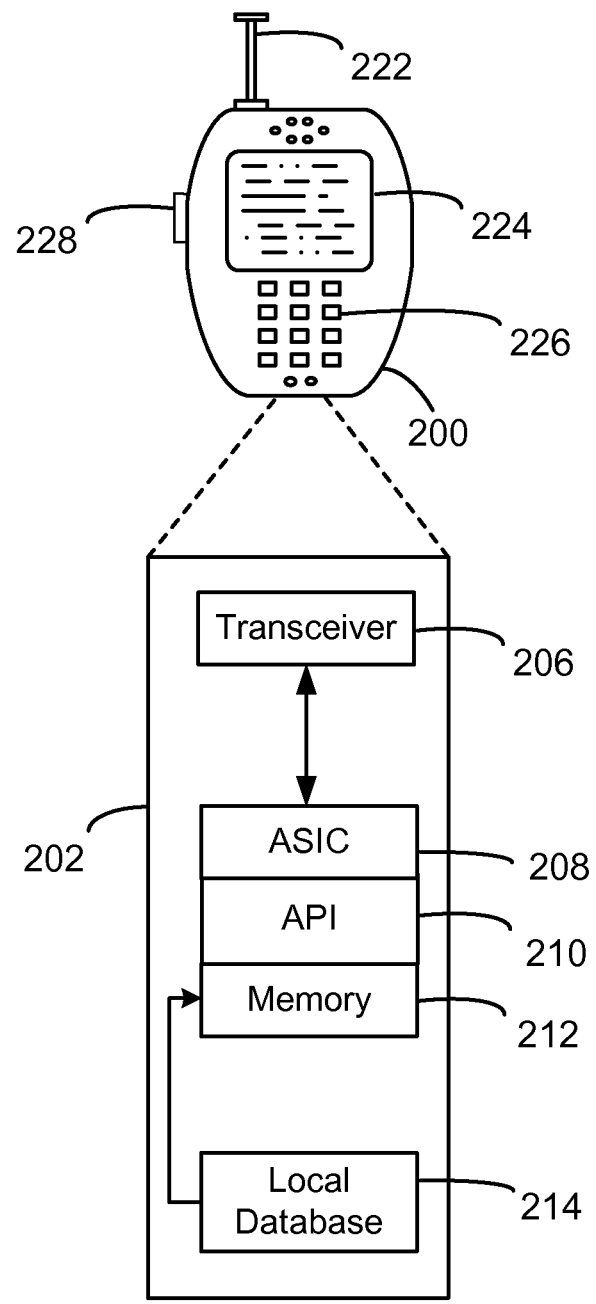
FIG. 3A is an illustration of a user equipment (UE) in accordance with at least one embodiment.

Referring to FIG. 3A, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE with the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3A are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3B:
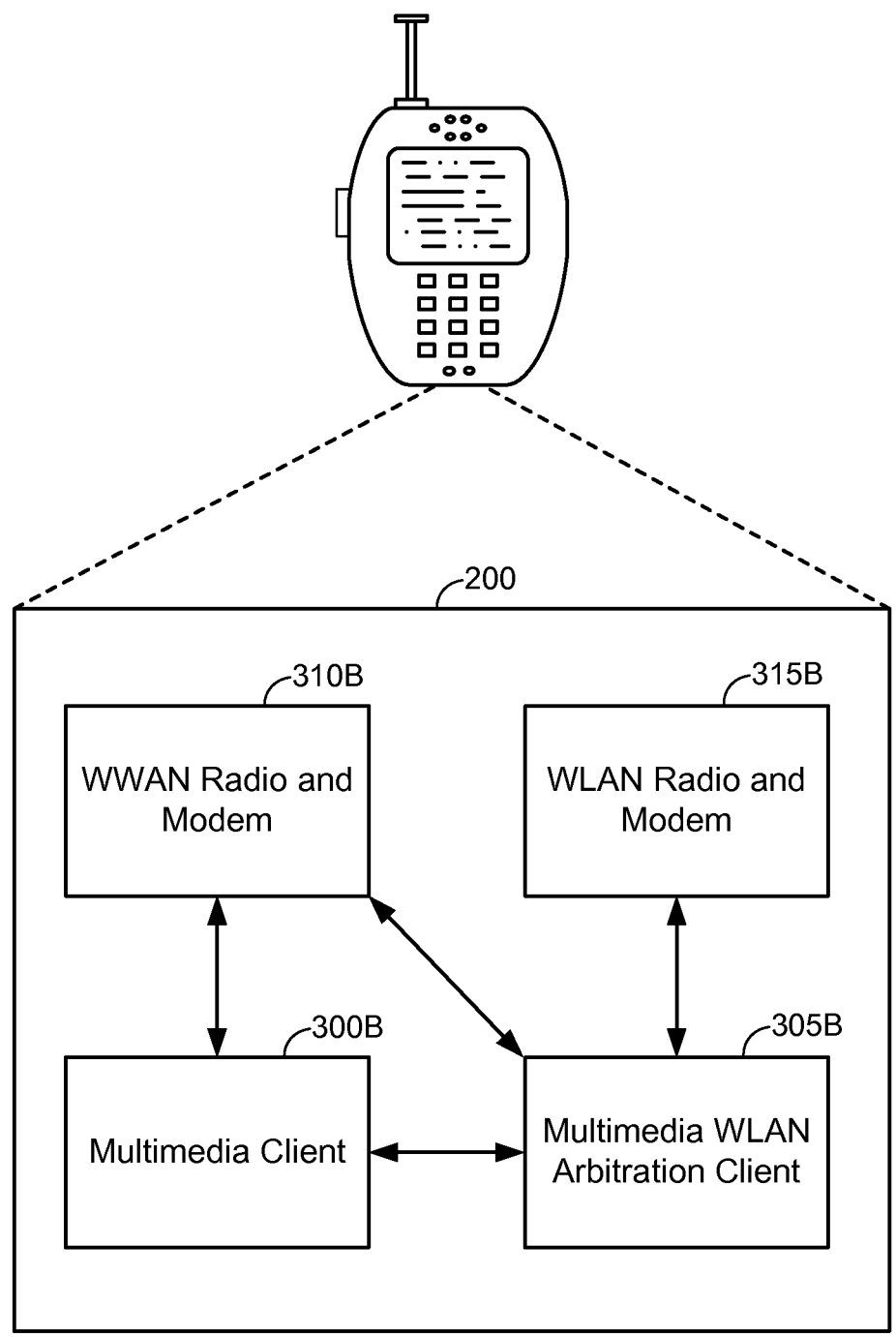
FIG. 3B illustrates software and/or hardware modules of the UE of FIG. 3A in accordance with another embodiment of the invention.

FIG. 3B illustrates software and/or hardware modules of the UE 200 in accordance with another embodiment of the invention. Referring to FIG. 3B, the UE 200 includes a multimedia client 300B, a multimedia arbitration client 305B, a Wireless Wide Area Network (WWAN) radio and modem 310B and a Wireless Local Area Network (WLAN) radio and modem 315B.

Referring to FIG. 3B, the multimedia client 300B corresponds to a client that executes on the UE 200 to support communication sessions (e.g., VoIP sessions, PTT sessions, PTX sessions, etc.) that are arbitrated by the application server 170 over the RAN 120, whereby the RAN 120 described above with respect to FIGS. 1 through 2B forms part of a WWAN. The multimedia WLAN arbitration client 305B of FIG. 3B corresponds to a module that works in conjunction with the multimedia client 300B for supporting the multimedia client's 300B communication sessions over a personal area network (PAN) and/or WLAN. The multimedia client 300B and multimedia WLAN arbitration client 305B can either correspond to different portions of the same client-executable software module or alternatively to separate client-executable software modules.

Further, the multimedia WLAN arbitration client 305B is capable of operating in different 'modes'. For example, the multimedia WLAN arbitration client 305B can operate in client-only mode, whereby the UE 200 can participate with other local UEs in a group communication session via a PAN as will be described below in more detail. Alternatively, the multimedia WLAN arbitration client 305B can operate as an arbitrator or in arbitration-mode. As will be described in greater detail below, at least a portion of the arbitration functions associated with the UE 200's communication sessions are supported by the multimedia WLAN arbitration client 305B when operating as arbitrator. In particular, arbitration functions for other UEs in a PAN of the UE 200 that are also participating (or attempting to participate) in a particular communication session are supported by the multimedia WLAN arbitration client 305B when acting in arbitration-mode. Also, UEs operating in client-only mode will generally communicate within the PAN and not the WWAN, whereas UEs operating in arbitration mode can, in at least one embodiment, be a point of contact for the PAN by the application server 170. Thus, when the application server 170 wants to modify a parameter associated with the PAN, the application server 170 contacts the arbitrator instead of contacting each PAN-participant individually.

Referring to FIG. 3B, the WWAN radio and modem 310B corresponds to hardware of the UE 200 that is used to establish a wireless communication link with the RAN 120, such as a wireless base station or cellular tower. In an example, when the UE 200 can establish a good connection with the application server 170, the application server 170 can be relied upon to fully arbitrate the UE 200's communication sessions such that the multimedia client 300B can interact with the WWAN radio modem 310B (to connect to the application server 170 via the RAN 120) to engage in the communication session.

The WLAN radio and modem 315B corresponds to hardware of the UE 200 that is used to establish a wireless communication link directly with other local UEs to form a PAN (e.g., via Bluetooth, WiFi, etc.), or alternatively connect to other local UEs via a local access point (AP) (e.g., a WLAN AP or router, a WiFi hotspot, etc.). In an example, when the UE 200 cannot establish an acceptable connection with the application server 170 (e.g., due to a poor physical-layer and/or backhaul connection), the application server 170 cannot be relied upon to fully arbitrate the UE 200's communication sessions. In this case, the multimedia client 300B can invoke or trigger the multimedia WLAN arbitration client 305B in an attempt to support a given communication session (at least partially) via a PAN using WLAN protocols (e.g., either in client-only or arbitration-mode).

Figure 4:
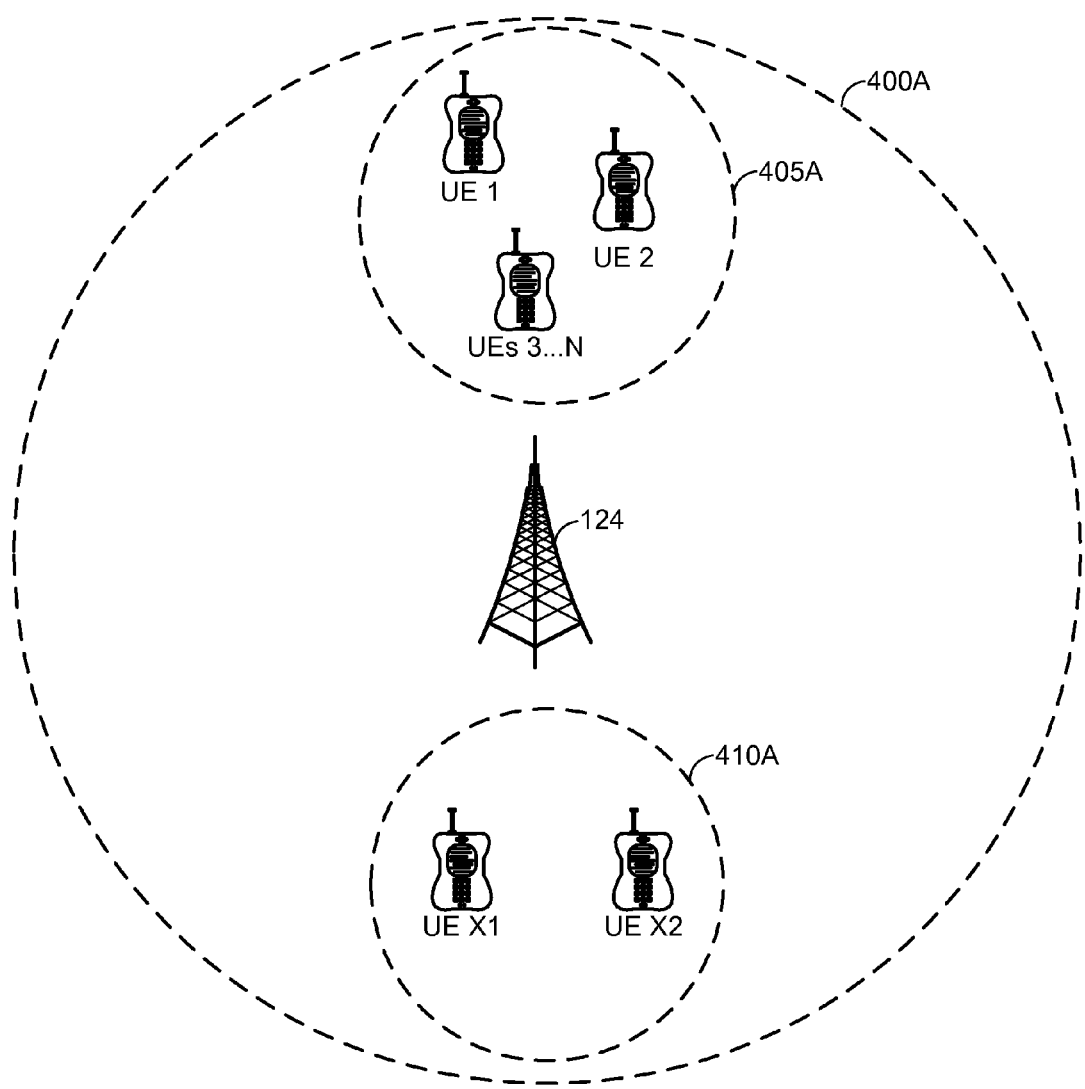
FIG. 4 illustrates a plurality of UEs positioned within a serving area of a given Node B in accordance with an embodiment of the invention.

FIG. 4 illustrates a plurality of UEs positioned within a serving area 400A of a given Node B 124 in accordance with an embodiment of the invention. Referring to FIG. 4, the Node B 124 is part of the RAN 120 of a WWAN. Accordingly, the serving area 400A of the given Node B 124 is relatively large (e.g., 4-mile radius, 5-mile radius, etc.). Within the serving area 400A of the given Node B 124, a first plurality of UEs 1 . . . N are geographically co-located within a first region 405A of the serving area 400A, and a second plurality of UEs X1 and X2 are geographically co-located within a second region 410A of the serving area 400A. In the description below, it may be assumed that the first plurality of UEs 1 . . . N in the first region 405A are close enough to establish a PAN with each other via WLAN protocols, and that the second plurality of UEs X1 and X2 in the second region 410A are also close enough to establish a PAN with each other via WLAN protocols.

As will be appreciated by one of ordinary skill in the art, it can be difficult for UEs to establish connections via a WWAN when a high number of UEs are concurrently attempting to access the WWAN. For example, in a disaster-type scenario (e.g., an earthquake, a terrorist attack, etc.), a high number of UEs in proximity to the disaster (e.g., in a serving area of the disaster, such as a sector, cluster of sectors or subnet) will be expected to make phone calls or exchange other types of media with a local Node B, which can potentially overload the system. This in turn makes it difficult for emergency personnel to connect to the local Node B and/or for a dispatcher to contact the emergency personnel near the disaster area. Conventionally, attempts to mitigate the resource scarcity issue for emergency or high-priority personnel in disaster areas is to reserve a given level of resources (e.g., MAC IDs, QoS resources, etc.) for the exclusive use of the high-priority personnel and/or to preempt resources already allocated to low-priority users for re-allocation to the high-priority personnel. However, this reduces the resources that are made available to lower-priority users, which degrades the user experience.

Figure 9A:
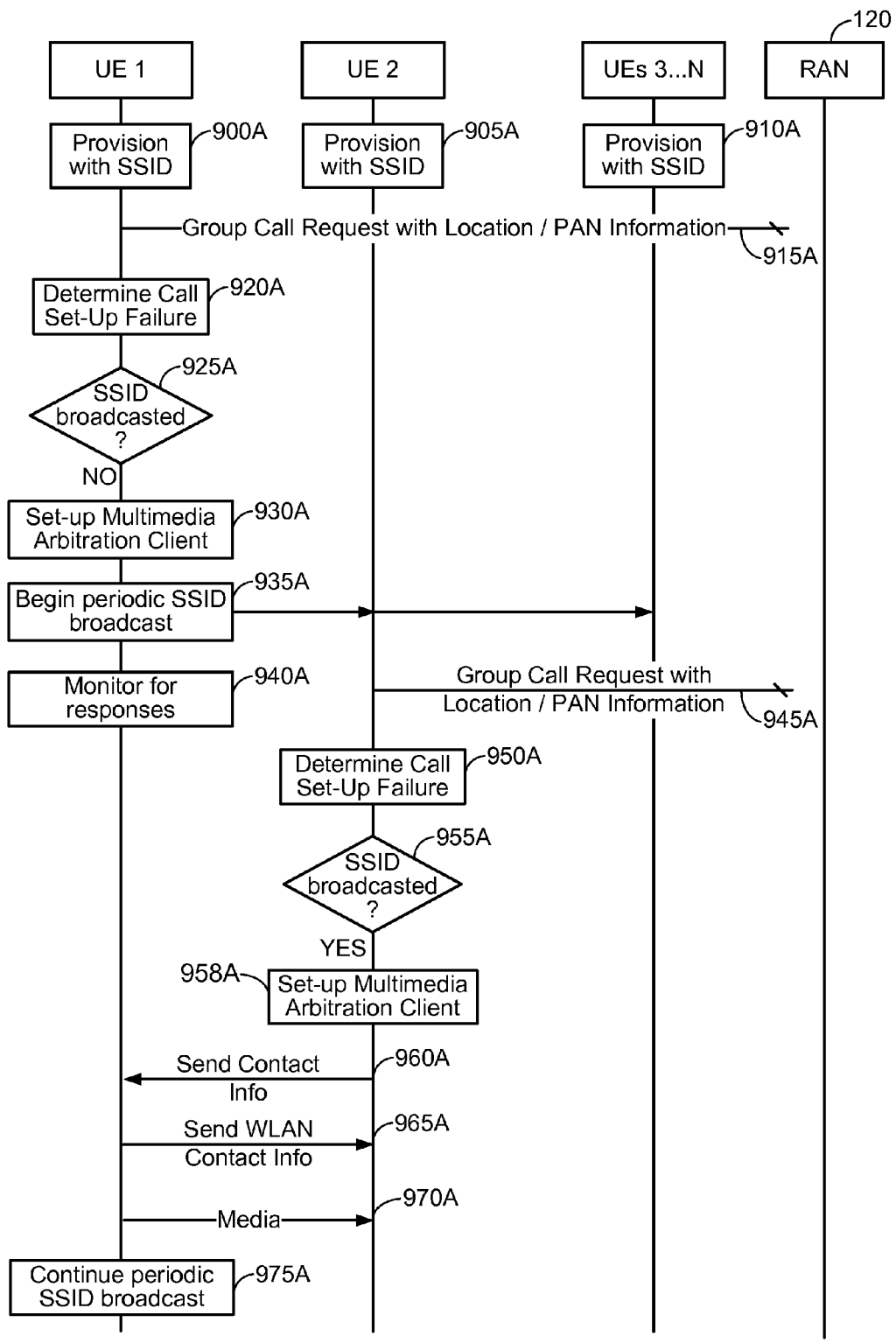
FIG. 9A illustrates a process of setting up a group communication session where one or more of the UEs attempting to participate in the group communication session cannot access a WWAN in accordance with an embodiment of the invention.
Figure 9B:
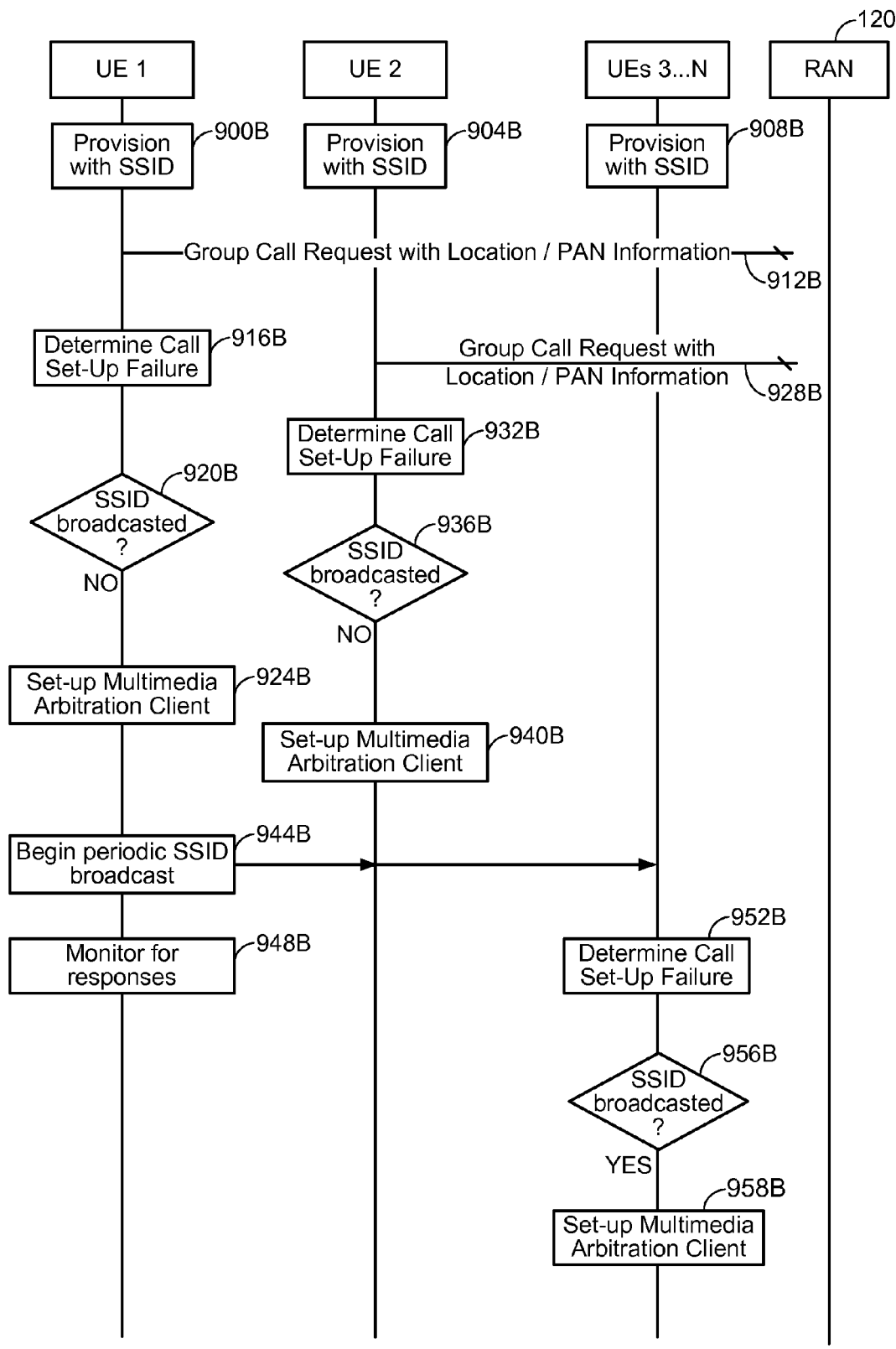
FIGS. 9B and 9C illustrate another process of setting up a group communication session where one or more of the UEs attempting to participate in the group communication session cannot access a WWAN in accordance with an embodiment of the invention.
Figure 9C:
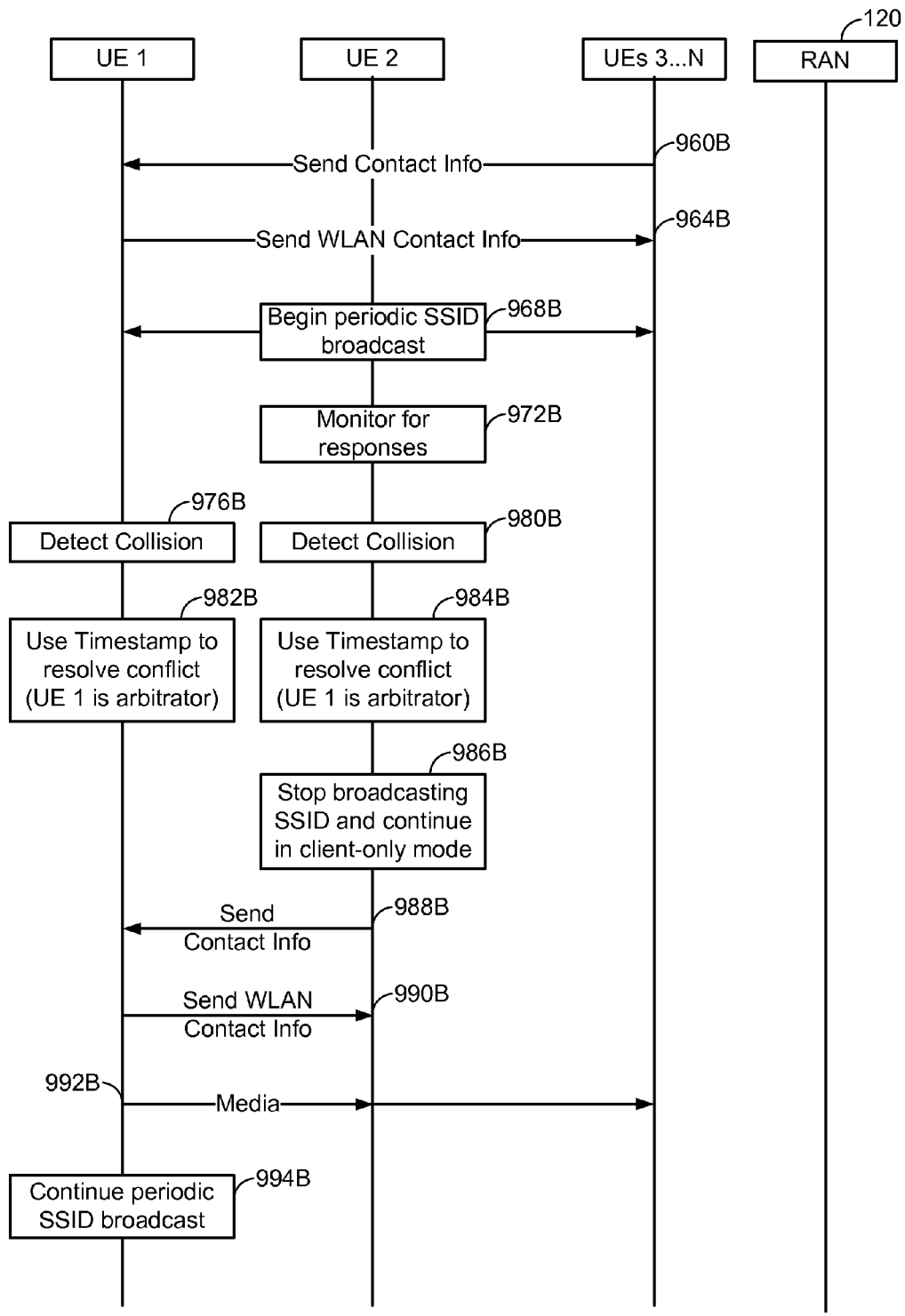
Figure 10:
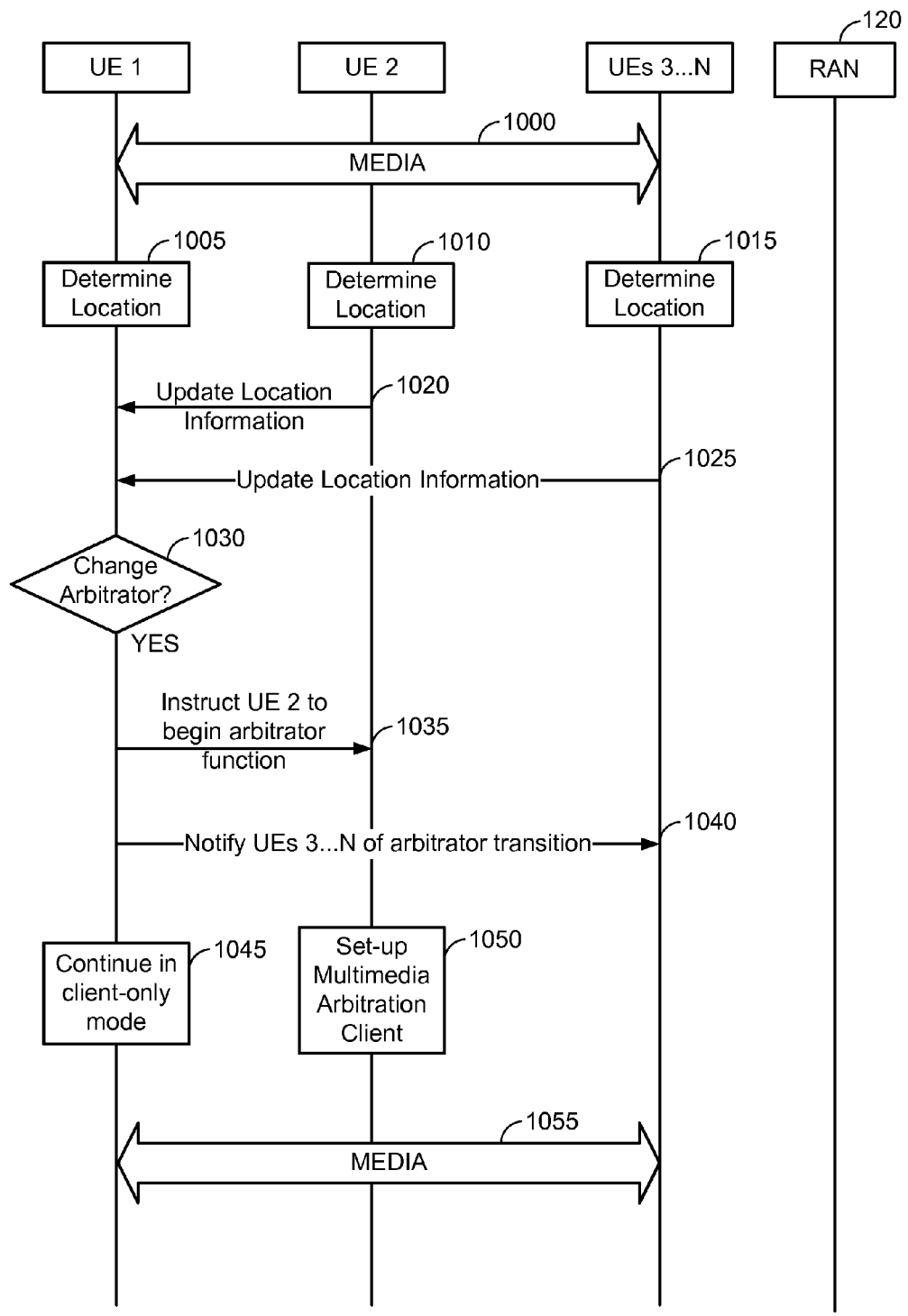
FIG. 10 illustrates process of transitioning an arbitration function from a first UE to a second UE during the process of FIG. 9A, FIG. 9B or FIG. 9C in accordance with an embodiment of the invention.

Embodiments of the invention are directed to partially or fully transitioning responsibilities for arbitrating a group communication session from the application server 170 to one or more UEs that are attempting to participate in the group communication session. At least a portion of the media exchanged during the group communication session can then be conveyed between UEs via one or more local wireless connections, or PANs. FIGS. 5A through 8 are directed to a scenario where one or more of the UEs attempting to participate in the group communication session can access the WWAN and the application server 170. However, to conserve WWAN resources, the support-level of the group communication session by the application server 170 is reduced and at least one UE participating in the group communication session will support a partial or full arbitration-function for the group communication session. FIGS. 9A through 10 are directed to a scenario where the UEs attempting to participate in the group communication session cannot access the WWAN and/or the application server 170, and instead rely upon self-arbitration of the group communication session exclusively via a local wireless connection or PAN.

Figure 5A:
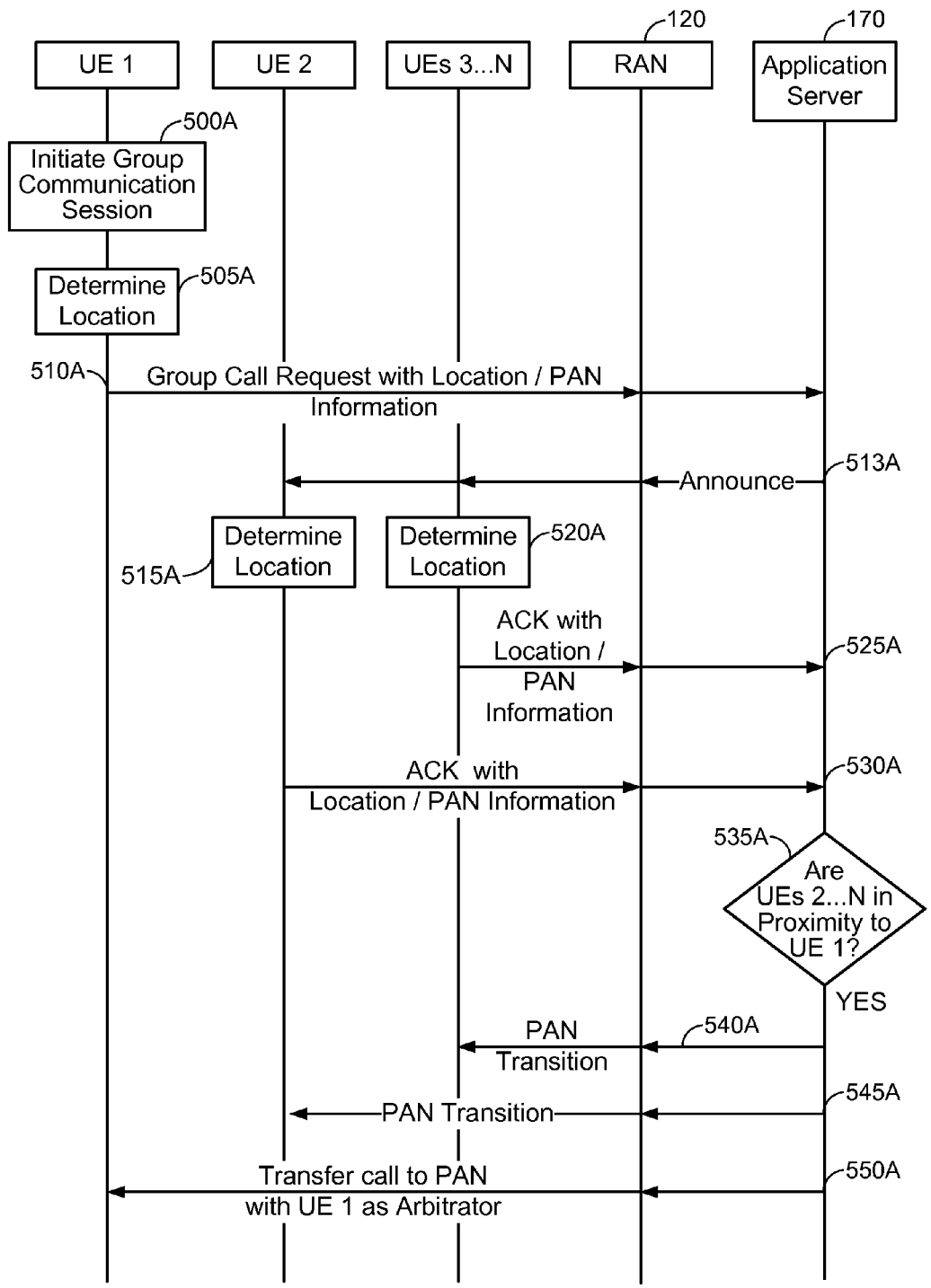
FIGS. 5A and 5B illustrate a process of setting up a group communication session where one or more of the UEs attempting to participate in the group communication session can access a Wireless Wide Area Network (WWAN) and floor-grant decisions are determined at a given UE performing an arbitration function in accordance with an embodiment of the invention.

Referring to FIG. 5A, UE 1 determines to initiate a group communication session to be arbitrated by the application server 170 over the WWAN, 500A. UE 1 then determines its location in 505A. In the embodiment of FIG. 5A, it may be assumed that the degree of accuracy to which the location of UE 1 is determined is sufficient to be compared against the reported locations of other UEs so that the application server 170 can determine whether a PAN including the respective UEs is capable of being set-up. For example, the location-determination of 505A can be based on a global positioning system (GPS) procedure, in an example. In the embodiment of FIG. 5A, it may further be assumed that UE 1 is capable of supporting the group communication session over a PAN via WLAN protocols, for example, based on UE 1 including the multimedia WLAN arbitration client 305B and the WLAN radio and modem 315B as shown in FIG. 3B.

Accordingly, UE 1 transmits a group call request message to the RAN 120, which forwards the group call request message to the application server 170, 510A. The group call request of 510A is configured to indicate the location of the UE 1 as determined in 505A, and is further configured to indicate to the application server 170 that UE 1 is PAN-capable. Alternatively, UE 1's PAN-capabilities may already be known by the application server 170 (e.g., set-up during a previous registration procedure) such that the group call request message need not include a PAN-capable indication. The application server 170 receives the group call request from UE 1, identifies UEs 2 . . . N as the target UEs for the group communication session and then sends a call announcement message to the RAN 120 for transmission to UEs 2 . . . N, 513A.

In the embodiment of FIG. 5A, assume that UEs 2 . . . N each receive the call announcement message and determine to join the announced group communication session. In the embodiment of FIG. 5A, it may further be assumed that UEs 2 . . . N are each capable of supporting the group communication session over a PAN via WLAN protocols, for example, based on UEs 2 . . . N each including the multimedia WLAN arbitration client 305B and the WLAN radio and modem 315B as shown in FIG. 3B. Accordingly, UEs 2 . . . N each determine their respective locations, 515A and 520A. For example, in 515A and 520A, it may be assumed that the degree of accuracy to which the location of UEs 2 . . . N is determined is sufficient to be compared against the reported locations of other UEs so that the application server 170 can determine whether a PAN including the respective UEs is capable of being set-up, as in 505A. After determining their respective locations, UEs 2 . . . N each transmit a call acceptance message to the application server 170, 525A and 530A. The call acceptance messages of 525A and 530A are configured to indicate the locations of the UEs 2 . . . N as determined in 515A and 520A, respectively, and are further configured to indicate to the application server 170 that UEs 2 . . . N are PAN-capable. Alternatively, the PAN-capabilities of UEs 2 . . . N may already be known by the application server 170 (e.g., set-up during a previous registration procedure) such that the call acceptance messages of 525A and 530A not include a PAN-capable indication.

After receiving a threshold number of ACKs to the call announcement message from the target UEs that indicate acceptance of the announced group communication session, the application server 170 determines whether the responsive UEs (e.g., UEs 2 . . . N) are in close proximity to UE 1 in 535A. In particular, the application server 170 determines the geographic area or region occupied by UEs 1 . . . N in order to determine whether a PAN can be used to support the group communication session between UEs 1 . . . N. As shown in FIG. 4, UEs 1 . . . N are positioned within the first region 405A, which is assumed to be sufficiently close (e.g., a few hundred meters) for a PAN-supported call via WLAN protocols. Accordingly, the application server 170 determines that the proximity of UEs 2 . . . N to UE 1 to be sufficient to transition the group communication session from a WWAN-supported call to a PAN-supported call in 535A. The application server 170 sends messages to UEs 1 . . . N to facilitate UEs 1 . . . N to transition to a PAN-supported group communication session with UE 1 being the designated arbitrator, 540A, 545A and 550A. In the embodiment of FIG. 5A, UE 1 is described as being the arbitrator for the PAN-supported group communication session based on UE 1's status as originator for the session. However, in another embodiment, the application server 170 may instead designate a UE that is geographically central to the PAN as the arbitrator so that the arbitrator is in a good position to relay messages to the other UEs in the session.

Figure 5B:
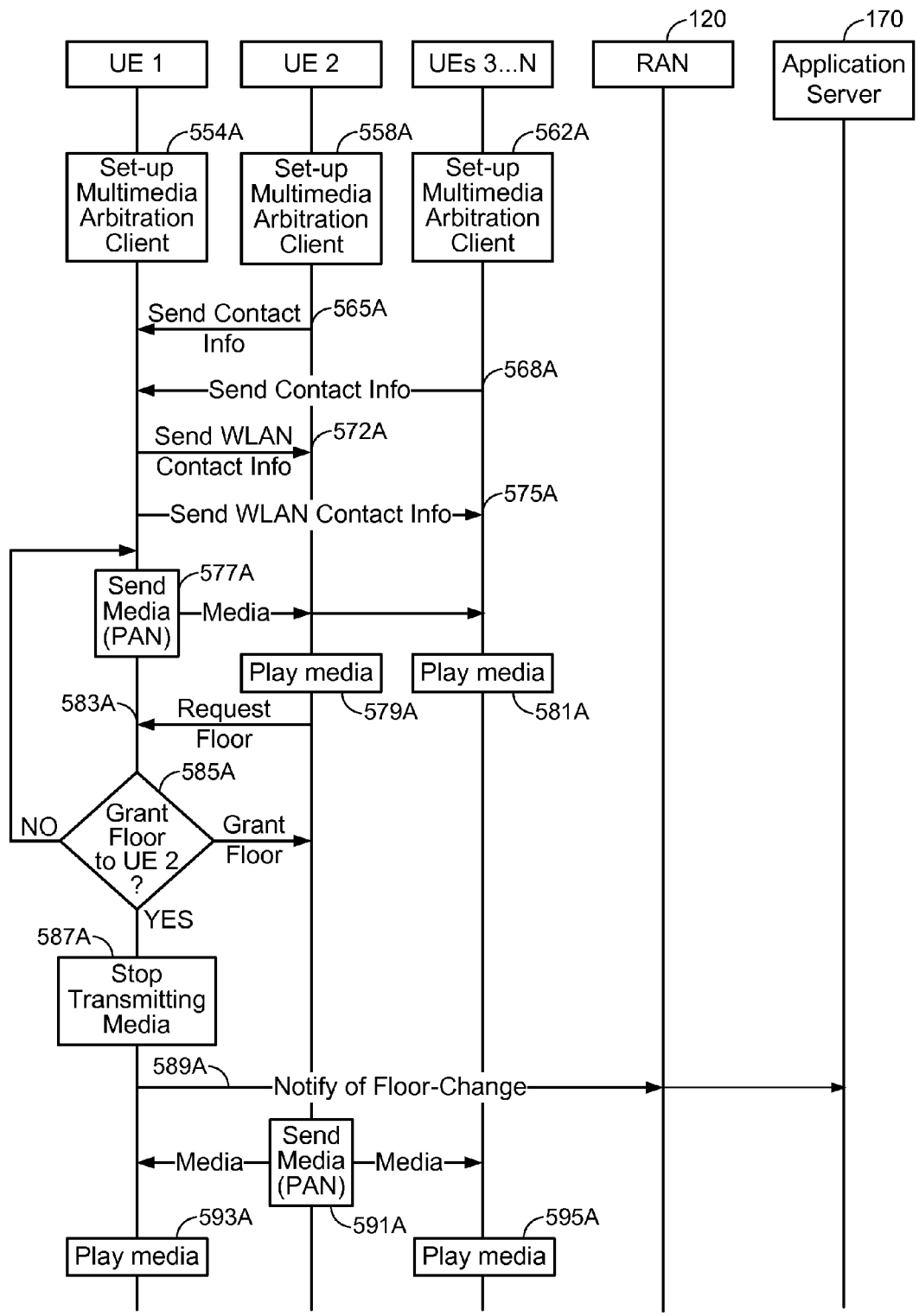

The process of FIG. 5A continues in FIG. 5B, whereby UEs 1 . . . N receive PAN-transition messages from the application server 170 and then load the multimedia WLAN arbitration client 305B for participating in the group communication session in the PAN via the WLAN protocols, 554A, 558A and 562A. As will be appreciated, UEs 2 . . . N are set-up to operate in client-only mode whereas UE 1 is set-up to operate as the arbitrator or in arbitration-mode. After loading the multimedia WLAN arbitration client 305B in 558A and 562A, UEs 2 . . . N negotiate with UE 1 to establish their WLAN contact information for the group communication session, 565A, 568A. Likewise, UE 1 sends its own WLAN contact information to UEs 2 . . . N, 572A and 575A.

After setting-up the WLAN contact information among UEs 1 . . . N, UE 1 starts the group communication session as the initial floor-holder and begins transmitting media to UEs 2 . . . N via WLAN protocols, 577A. As will be appreciated, the WWAN is bypassed and the media being exchanged in 577A corresponds to local WLAN (e.g., 802.11 or WiFi) traffic that is exchanged within the first region 405A between UEs 1 . . . N. Also, the media exchanged in 577A can be directly conveyed from UE 1 to UEs 2 . . . N without the use of a WLAN router or AP in an example. UEs 2 . . . N receive the media from UE 1 and playback the received media via respective audio output devices to their users, 579A and 581A.

At some later point in time, assume that the user of UE 2 indicates a desire to speak to the communication group. For example, if the group communication session corresponds to a half-duplex PTT call, the indication can correspond to the user of UE 2 pushing a PTT button thereon. In the embodiment of FIG. 5B, assume that floor-contention is resolved at the PAN by the arbitrator of the PAN, in this case, UE 1. Thus, in addition to transmitting and receiving media associated with the group communication session, UE 1 also monitors for floor-requests and/or floor-release messages from other UEs participating in the group communication session. If multiple UEs request the floor, in FIG. 5B, the multimedia WLAN arbitration client 305B that is operating in arbitration-mode at UE 1 is capable of establishing ranks for the requesting UEs and selecting one of the requesting UEs to be the next floor-holder.

Accordingly, UE 2 transmits a floor request to the arbitrator of the PAN (i.e., UE 1) via the WLAN protocols established for the PAN, 583A. UE 1 receives the floor-request and the multimedia WLAN arbitration client 305B of UE 1 executes logic to determine whether to grant the floor to UE 2, 585A. For example, in 585A, the relative priorities or ranks of UE 1 (i.e., the current speaker) and UE 2 can be compared by UE 1 to determine whether to force UE 1 to release the floor while granting the floor to UE 2.

If the multimedia WLAN arbitration client 305B of UE 1 determines not to grant the floor to UE 2 in 585A, the process returns to 577A and UE 1 continues to transmit media within the PAN to UEs 2 . . . N via WLAN protocols. Otherwise, if the multimedia WLAN arbitration client 305B of UE 1 determines to grant the floor to UE 2 in 585A, a floor-grant message is sent to UE 2 within the PAN via WLAN protocols in 585A and UE 1 stops transmitting media, 587A. While UE 1 is no longer the floor-holder at this point, UE 1 can remain the arbitrator of the group communication session within the PAN in an embodiment. Thus, floor-transitions do not necessarily correlate with arbitration-transitions. As will be described later, the UE responsible for arbitrating the group communication session can be transitioned based on the locations of the UEs in the PAN so that a geographically 'central' UE of the PAN is set as the arbitrator, which is described in more detail below with respect to FIG. 8.

In the embodiment of FIG. 5B, after transitioning the floor from UE 1 to UE 2, UE 1 transmits a reverse-link message over the WWAN (e.g., to a serving Node B of the RAN 120) to the application server 170 that notifies the application server 170 of the floor-change. It will be appreciated that the notification of 589A is an optional step that keeps the application server 170 apprised of the floor-status for the group communication session. In another embodiment, the notification of 589A need not be performed in which case the application server 170 will not be aware of the floor-holder status for the group communication session after the session is established and then transferred to the arbitrator of the PAN.

After obtaining the floor, UE 2 begins transmitting media to UEs 1 and 3 . . . N via WLAN protocols, 591A. Similar to 577A, the WWAN is bypassed and the media being exchanged in 591A corresponds to local WLAN (e.g., 802.11 or WiFi) traffic that is exchanged within the first region 405A between UEs 1 . . . N. Also, the media exchanged in 591A can be directly conveyed from UE 2 to UEs 1 and 3 . . . N without the use of a WLAN router or AP in an example. UEs 1 and 3 . . . N receive the media from UE 2 and playback the received media via respective audio output devices to their users, 593A and 595A.

Figure 5C:
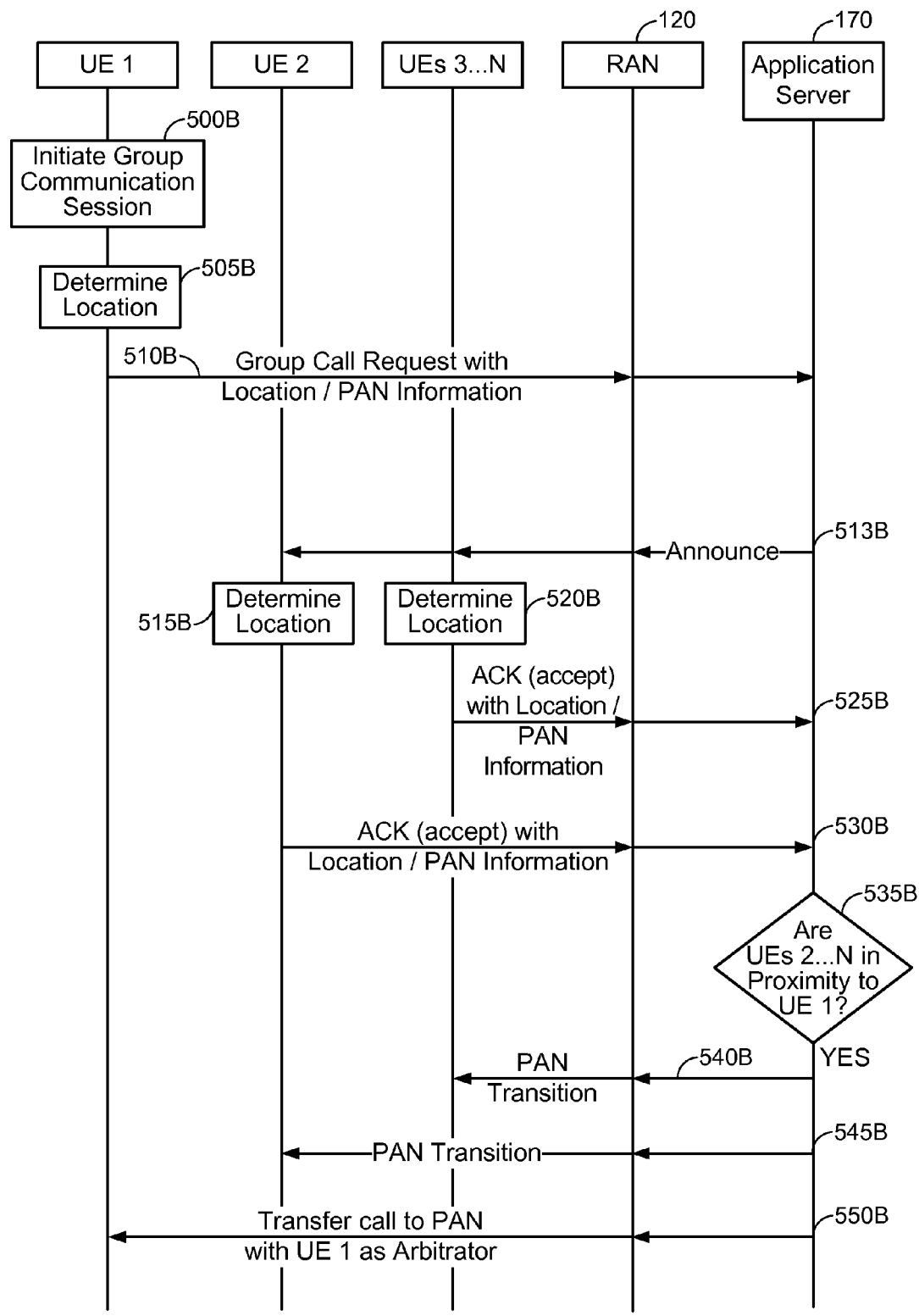
FIGS. 5C and 5D illustrate a process of setting up a group communication session where one or more of the UEs attempting to participate in the group communication session can access a WWAN and floor-grant decisions are determined at an application server in accordance with an embodiment of the invention.
Figure 5D:
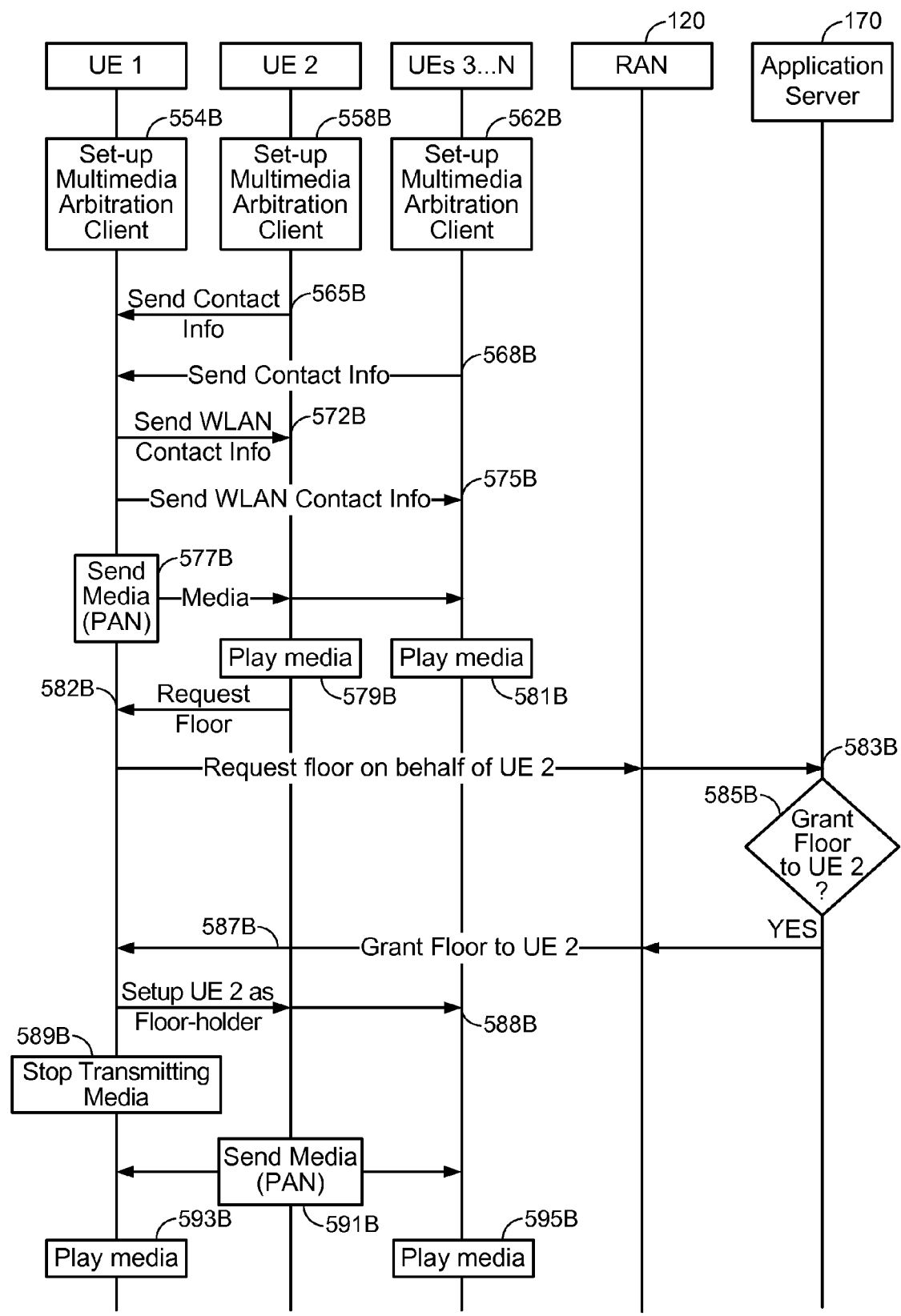

FIGS. 5C and 5D illustrate a process of setting-up of another PAN-supported group communication session in accordance with another embodiment of the invention. FIGS. 5C and 5D are similar to FIGS. 5A and 5B except that floor-contention is resolved by the application server 170 in the embodiment of FIGS. 5C and 5D instead of the PAN-arbitrator as in the embodiment of FIGS. 5A and 5B. Referring to FIGS. 5C and 5D, 500B through 581B correspond to 500A through 581A, respectively, of FIGS. 5A and 5B, and will not be described further for the sake of brevity.

Referring to FIG. 5D, at some point after UE 1 begins to transmit media within the PAN to UEs 2 . . . N in 577B, assume that the user of UE 2 indicates a desire to speak to the communication group. For example, if the group communication session corresponds to a half-duplex PTT call, the indication can correspond to the user of UE 2 pushing a PTT button thereon. In the embodiment of FIG. 5D, assume that floor-contention is resolved at the application server 170. Thus, even though media is exchanged within the PAN via WLAN protocols without interaction with the WWAN in the embodiment of FIG. 5D, floor-transfers are handled by the application server 170 over the WWAN.

Accordingly, UE 2 transmits a floor request to UE 1, 582B, and UE 1 then forwards UE 2's floor request to the application server 170 via the WWAN (e.g., the RAN 120), 583B. The application server 170 receives the floor-request and executes logic to determine whether to grant the floor to UE 2, 585B. For example, in 585B, the relative priorities or ranks of UE 1 (i.e., the current speaker) and UE 2 can be compared by the application server 170 to determine whether to force UE 1 to release the floor while granting the floor to UE 2.

While not shown in FIG. 5D, if the application server 170 determines not to grant the floor to UE 2 in 585B, the application server 170 notifies UE 1 that UE 2's floor-request has been denied, and UE 1 continues to transmit media within the PAN to UEs 2 . . . N via WLAN protocols. Otherwise, if the application server 170 determines to grant the floor to UE 2 in 585B, a floor-grant message is sent by the application server 170 to UE 1 over the WWAN, 587B, after which UE 1 can facilitate a transition of the floor to UE 2 within the PAN, 588B. While UE 1 is no longer the floor-holder at this point, UE 1 can remain the arbitrator of the group communication session within the PAN in an embodiment. Thus, floor-transitions do not necessarily correlate with arbitration-transitions. As will be described later, the UE responsible for arbitrating the group communication session can transition based on the locations of the UEs in the PAN so that a geographically 'central' UE of the PAN is set as the arbitrator.

In the embodiment of FIG. 5D, after UE 1 gives up the floor, UE 1 stops transmitting media to the communication group, 589B. After obtaining the floor, UE 2 begins transmitting media to UEs 1 and 3 . . . N within the PAN via WLAN protocols, 591B. Similar to 577B, the WWAN is bypassed and the media being exchanged in 591B corresponds to local WLAN (e.g., 802.11 or WiFi) traffic that is exchanged within the first region 405A between UEs 1 . . . N. Also, the media exchanged in 591B can be directly conveyed from UE 2 to UEs 1 and 3 . . . N without the use of a WLAN router or AP in an example. UEs 1 and 3 . . . N receive the media from UE 2 and playback the received media via respective audio output devices to their users, 593B and 595B.

Figure 6A:
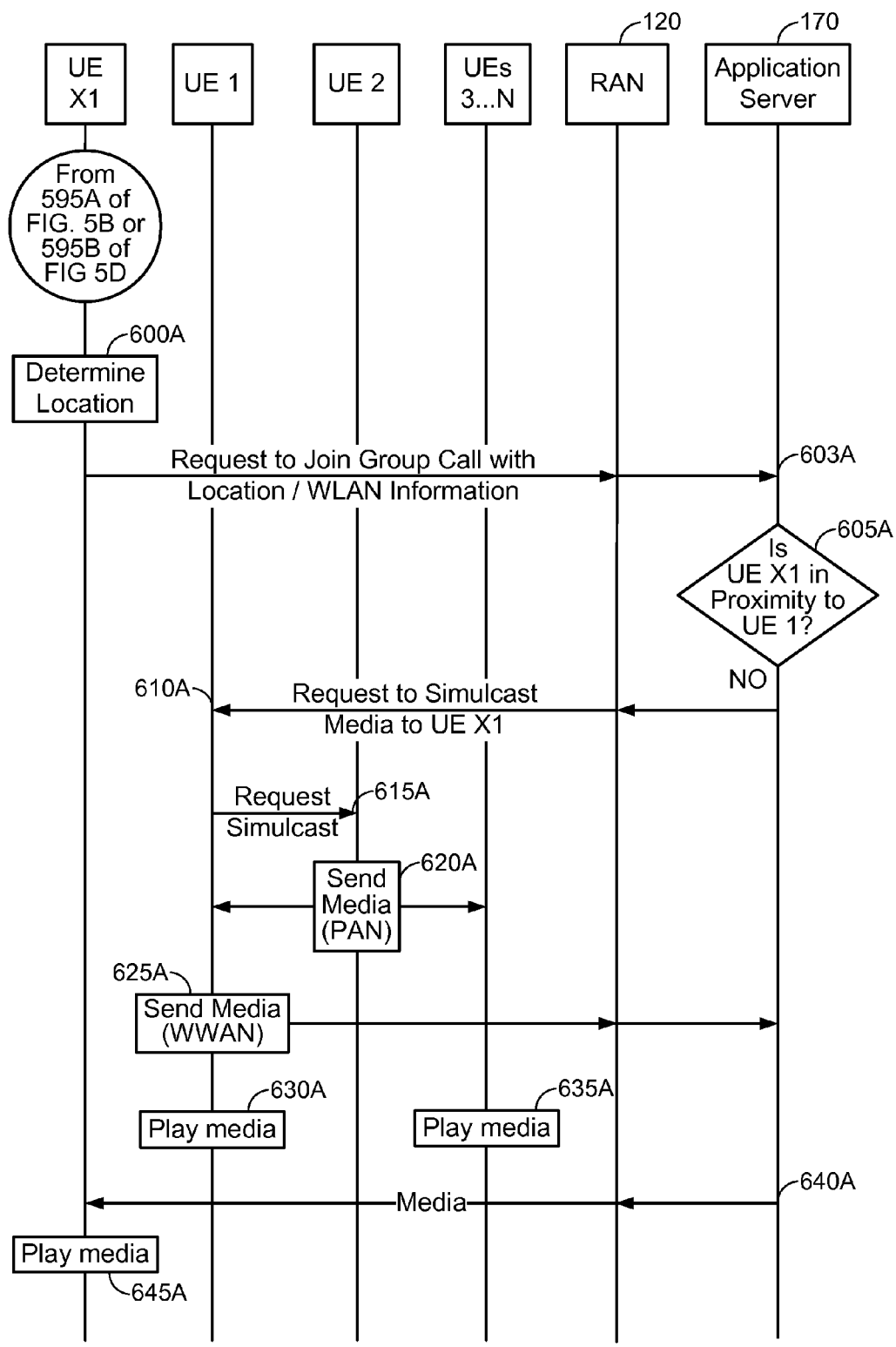
FIG. 6A illustrates a continuation of the process of FIG. 5B or FIG. 5D in accordance with an embodiment of the invention.

FIG. 6A illustrates a continuation of the process of FIG. 5B or FIG. 5D in accordance with an embodiment of the invention. In the embodiment of FIG. 6A, the group communication session is initially established for UEs 1 . . . N based on a PAN within the first region 405A being arbitrated by UE 1. After 595A of FIG. 5B or 595B of FIG. 5D, while UE 2 holds the floor and is transmitting within the PAN to UEs 1 and 3 . . . N, assume that UE X1 within the second region 410A becomes aware of the group communication session and wants to join in. Thus, UE X1 determines its location in 600A and then sends a request to join the group communication session to the application server 170 via the RAN 120 over the WWAN, 603A.

The application server 170 receives the group join request from UE X1 and determines whether UE X1 is in proximity to UE 1 in 605A. In other words, the application server 170 attempts to figure out whether UE X1 can simply be added to the existing PAN that is already supporting the group communication session with UE 1 as the arbitrator in 605A. Because the first and second regions 405A and 410A are far apart relative to the coverage are of the PAN, the application server 170 determines that UE X1 cannot be supported by the PAN in 605A and thereby requests the arbitrator of the PAN in the first region 405A (i.e., UE 1) to begin simulcasting media to the PAN in the first region and to the application server so that UE X1 can join the group communication session, 610A. Because UE 1 is no longer the floor-holder, UE 1 relays the simulcasting request to UE 2, 615B. Upon receiving the simulcasting request from the arbitrator (i.e., UE 1), UE 2 continues to send media to UEs 1 and 3 . . . N over the PAN via WLAN protocols, 620A, and UE 1 also begins transmitting the media, received over the PAN from UE 2, to the application server 170 over the WWAN, 625A.

UEs 1 and 3 . . . N receive the media from UE 2 and playback the received media via respective audio output devices to their users, 630A and 635A. The application server 170 receives UE 2's simulcasted media from UE 1, and forwards UE 2's media back to the RAN 120 for transmission to UE X1, 640A. UE X1 receives UE 2's media and plays-back the received media via an audio output device to its user, 645A.

Figure 6B:
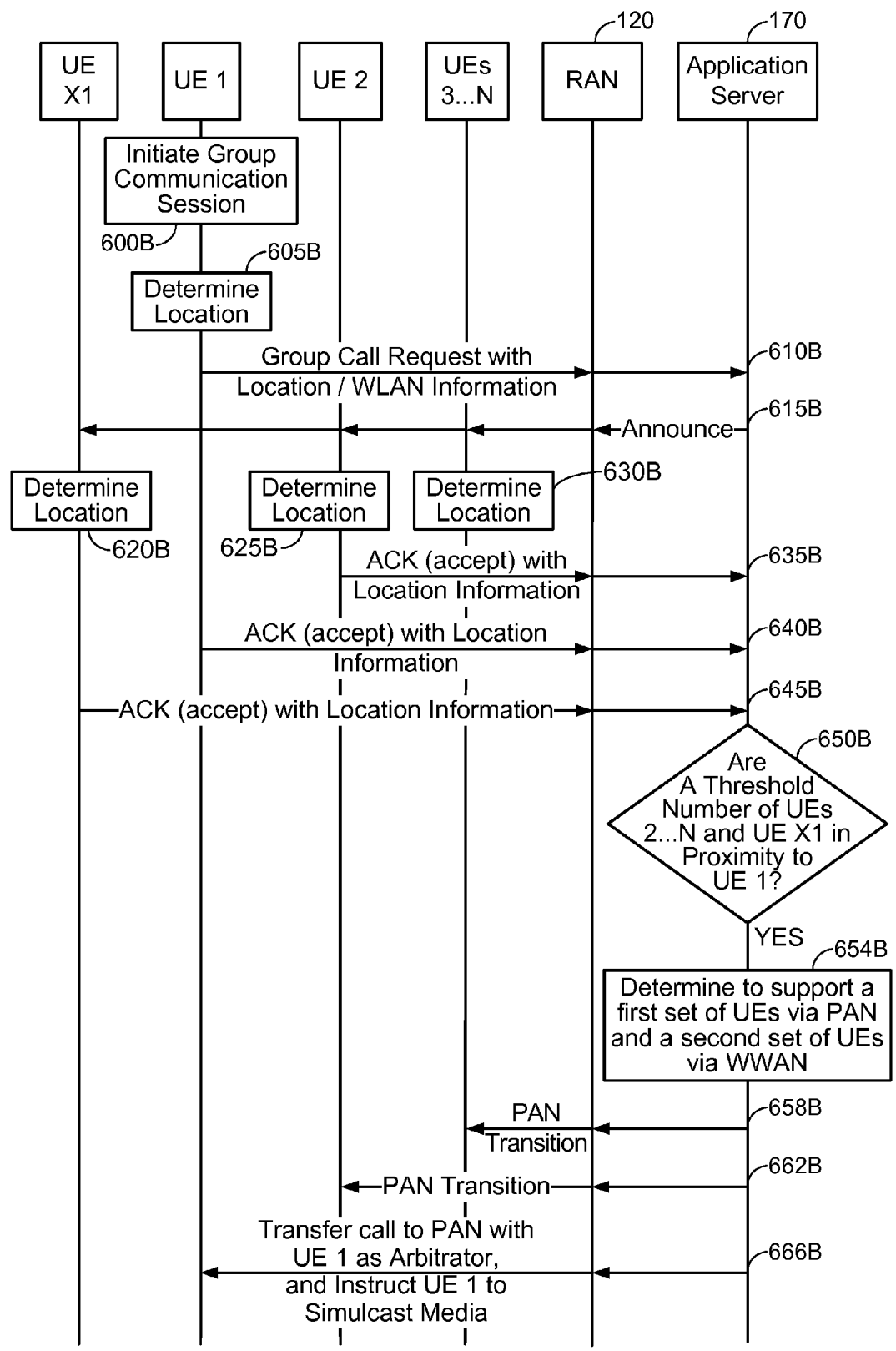
FIGS. 6B and 6C illustrate a process of setting up a group communication session where one or more of the UEs attempting to participate in the group communication session can access a WWAN and less than all of the one or more UEs can be supported in the same PAN in accordance with an embodiment of the invention.
Figure 6C:
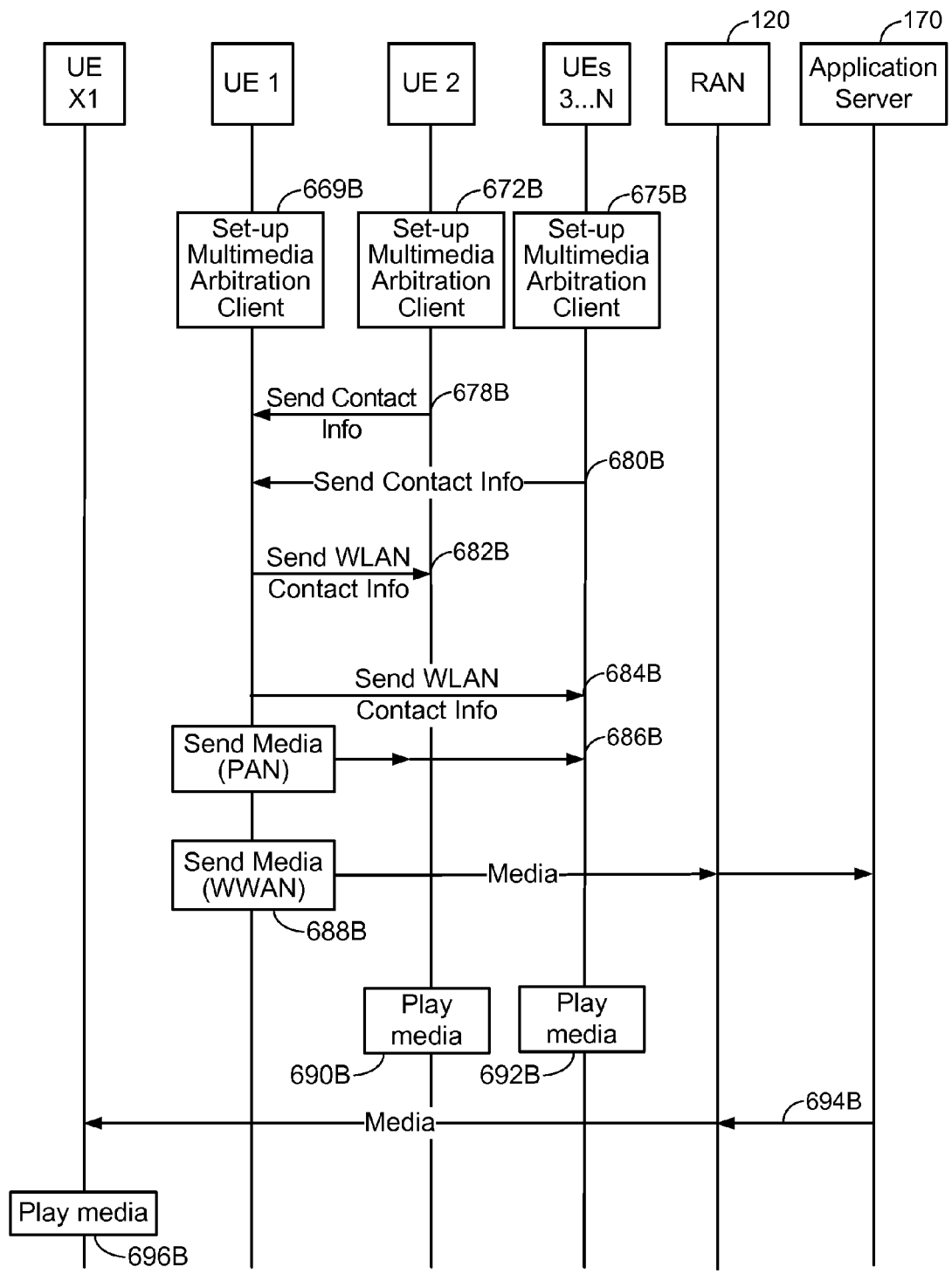

FIGS. 6B and 6C illustrate a process of setting up a group communication session that is similar to FIGS. 5A through 5D, except the initial participants to the group communication session in FIGS. 6B and 6C include a UE (i.e., UE X1) within the second region 410A that cannot be made part of the PAN being arbitrated by UE 1 in the first region 405A.

Referring to FIG. 6B, UE 1 determines to initiate a group communication session to be arbitrated by the application server 170 over the WWAN, 600B. UE 1 then determines its location in 605B (e.g., similar to 505A of FIG. 5A). UE 1 transmits a group call request message to the RAN 120, which forwards the group call request message to the application server 170, 610B. The group call request of 610B is configured to indicate the location of the UE 1 as determined in 605B, and is further configured to indicate to the application server 170 that UE 1 is PAN-capable. Alternatively, UE 1's PAN-capabilities may already be known by the application server 170 (e.g., set-up during a previous registration procedure) such that the group call request message need not include a PAN-capable indication. The application server 170 receives the group call request from UE 1, identifies at least UEs 2 . . . N and X1 as the target UEs for the group communication session and then sends a call announcement message to the RAN 120 for transmission to UEs 2 . . . N and X1, 615B.

In the embodiment of FIG. 6B, assume that UEs 2 . . . N and X1 each receive the call announcement message and determine to join the announced group communication session. In the embodiment of FIG. 6B, it may further be assumed that at least UEs 2 . . . N are each capable of supporting the group communication session over a PAN via WLAN protocols, for example, based on UEs 2 . . . N each including the multimedia WLAN arbitration client 305B and the WLAN radio and modem 315B as shown in FIG. 3B. It is also possible that UE X1 is similarly configured for PAN-session support but this is not strictly necessary in the embodiment of FIG. 6B. Accordingly, UEs 2 . . . N and X1 each determine their respective locations, 620B, 625B and 630B. For example, in 620B, 625B and 630B, it may be assumed that the degree of accuracy to which the location of UEs 2 . . . N and X1 is sufficient to be compared against the reported locations of other UEs so that the application server 170 can determine whether a PAN including the respective UEs is capable of being set-up, as in 605B. After determining their respective locations, UEs 2 . . . N and X1 each transmit a call acceptance message to the application server 170, 635B, 640B and 645B. The call acceptance messages of 635B, 640B and 645B are configured to indicate the locations of the UEs 2 . . . N and X1 as determined in 620B, 625B and 630B, respectively, and are further configured to indicate to the application server 170 at least that UEs 2 . . . N are PAN-capable. Alternatively, the PAN-capabilities of UEs 2 . . . N and/or X1 may already be known by the application server 170 (e.g., set-up during previous registration procedures) such that the call acceptance messages need not include a PAN-capable indication.

After receiving a given number of ACKs to the call announcement message from the target UEs that indicate acceptance of the announced group communication session, the application server 170 determines whether a threshold number of the responsive UEs (e.g., UEs 2 . . . N) are in close proximity to UE 1 such that setting-up a PAN in proximity of UE 1 is warranted, 650B. In particular, the application server 170 determines the geographic area or region occupied by UEs 1 . . . N and X1 in order to determine whether a PAN can be used to support the group communication session between UEs 1 . . . N. As shown in FIG. 4, UEs 1 . . . N are positioned within the first region 405A, which is assumed to be sufficiently close for a PAN-supported call via WLAN protocols, whereby UE X1 is in the second region 410A and cannot be made part of the PAN in the first region 405A. Accordingly, the application server 170 determines the proximity of UEs 2 . . . N to UE 1 to be sufficient to transition the group communication session from a WWAN-supported call to a PAN-supported call in 650B, even though UE X1 cannot be made part of the PAN. Thus, in 654B, the application server 170 determines to support a first set of UEs (i.e., UEs 1 . . . N) with a PAN via WLAN protocols and a second set of UEs (i.e., UE X1) via the WWAN.

The application server 170 thereby sends messages to UEs 1 . . . N to facilitate UEs 1 . . . N to transition to a PAN-supported group communication session with UE 1 being the designated arbitrator, 658B, 662B and 666B. In addition, the messaging of 666B to UE 1 requests that the arbitrator of the PAN in the first region 405A (i.e., UE 1) begin simulcasting media so that UE X1 can participate in the group communication session.

Next, the process proceeds to FIG. 6C whereby 669B through 686B of FIG. 6C correspond to 554A to 577A of FIG. 5B, respectively, and will not be described further for the sake of brevity. In addition to sending media to UEs 2 . . . N over the PAN via WLAN protocols in 686B, UE 1 (e.g., the arbitrator or WWAN point-of-contact for the communication session) also begins transmitting the media to the application server 170 over the WWAN, 688B. Meanwhile, UEs 2 . . . N receive the media from UE 1 (from 686B) and playback the received media via respective audio output devices to their users, 690B and 692B. The application server 170 receives the media from UE 1, and forwards the media from UE 1 back to the RAN 120 for transmission to UE X1, 694B. UE X1 receives the media from UE 1 and plays-back the received media via an audio output device to its user, 696B.

Figure 7:
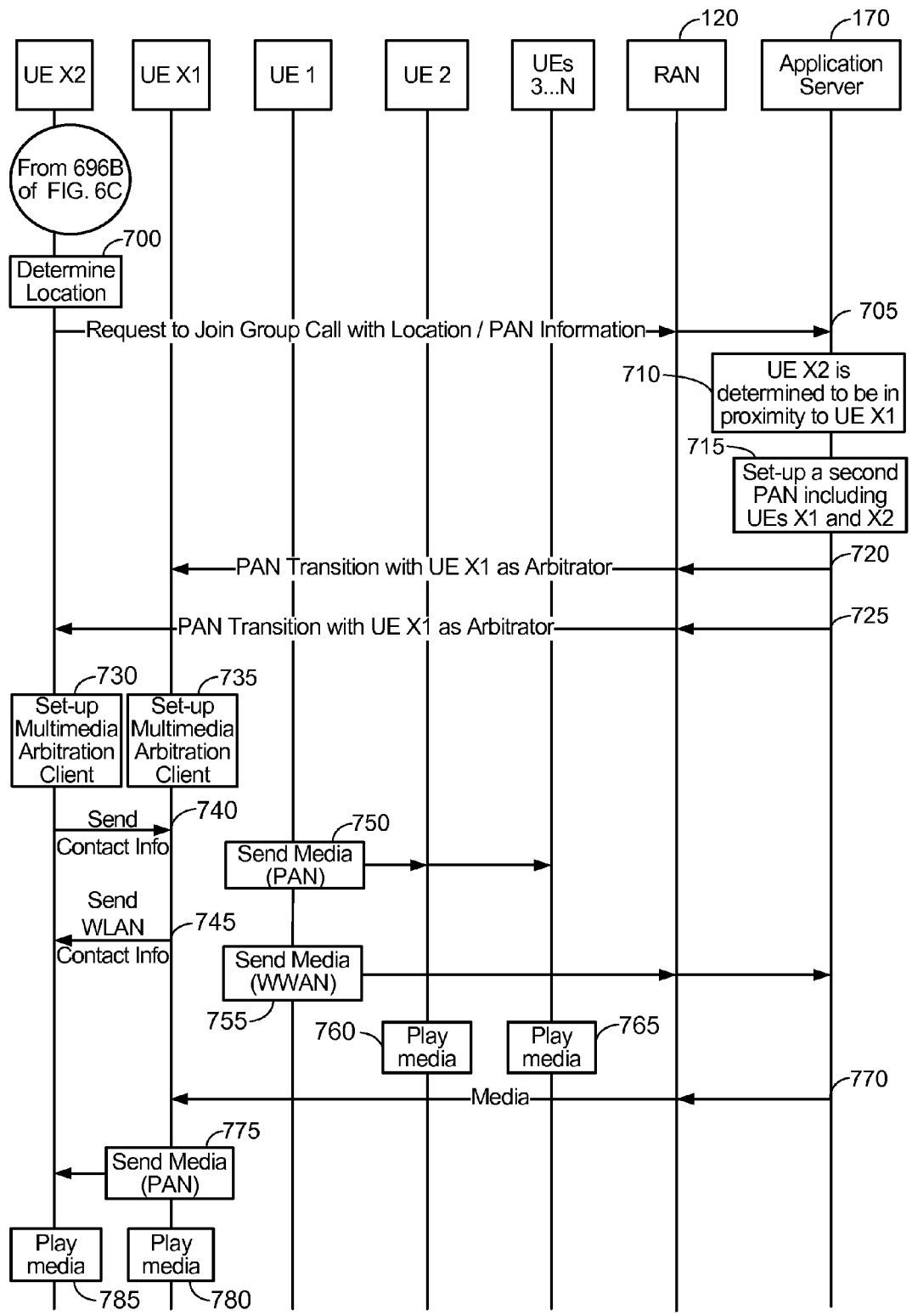
FIG. 7 illustrates a continuation of the process of FIG. 6C in accordance with an embodiment of the invention.

FIG. 7 illustrates a continuation of the process of FIG. 6C in accordance with an embodiment of the invention. In the embodiment of FIG. 7, the group communication session is initially established for UEs 1 . . . N based on a PAN within the first region 405A being arbitrated by UE 1 and also for UE X1 via a separate WWAN connection, arbitrated by the application server 170, to the PAN being arbitrated by UE 1. After 696B of FIG. 6C, while UE 1 holds the floor and is transmitting within the PAN to UEs 2 . . . N while also simulcasting media to the application server 170 for transmission to UE X1, assume that UE X2 within the second region 410A becomes aware of the group communication session and wants to join. Thus, UE X2 determines its location in 700 and then sends a request to join the group communication session to the application server 170 via the RAN 120 over the WWAN, 705.

The application server 170 receives the group join request from UE X2 and determines that UE X2 is in proximity to UE X1 and could be set-up in a PAN with UE X1, 710. Accordingly, the application server 170 determines to set-up UEs X1 and X2 as a second PAN supporting the group communication session in the second region 410A, 715.

The application server 170 sends messages to UEs X1 and X2 to facilitate UEs 1 . . . N to transition to a PAN-supported group communication session with UE X1 being the designated arbitrator within the second region 410A, 720 and 725. UEs X1 and X2 receive their respective instructions from the application server 170 and then load the multimedia WLAN arbitration client 305B for participating in the group communication session in the PAN via the WLAN protocols, 730 and 735. As will be appreciated, UEs X2 is set-up to operate in client-only mode whereas UE X1 is set-up to operate as the arbitrator or in arbitration-mode. After loading the multimedia WLAN arbitration client 305B in 730 and 735, UEs X1 and X2 negotiate with each other to establish UE X2's WLAN contact information for the group communication session, 740. Likewise, UE X1 sends its own WLAN contact information to UE X2, 745.

Next, UE 1 continues to send media to UEs 2 . . . N over the first PAN within the first region 405A via WLAN protocols, 750, and UE 1 (e.g., the arbitrator or WWAN point-of-contact for the communication session) also begins transmitting the media to the application server 170 over the WWAN, 755. UEs 2 . . . N receive the media from UE 1 and playback the received media via respective audio output devices to their users, 760 and 765. The application server 170 receives the media from UE 1, and forwards the media from UE 1 back to the RAN 120 for transmission to UE X1, 770. UE X1 receives the media from UE 1 and re-transmits the media to UE X2 over the second PAN within the second region 410A via WLAN protocols, 775. UEs X1 and X2 each play back the received media via an audio output device to its user, 780 and 785.

As discussed above, during any of the PAN-supported group communication sessions described above, the identity of the arbitrator can be transitioned to another UE. In the example described below with respect to FIG. 8, an arbitrator transition is triggered based on the location of another UE in the same PAN as the arbitrator and participating in the group communication session becoming more suitable for executing the arbitration function as compared to the initial arbitrator.

Figure 8:
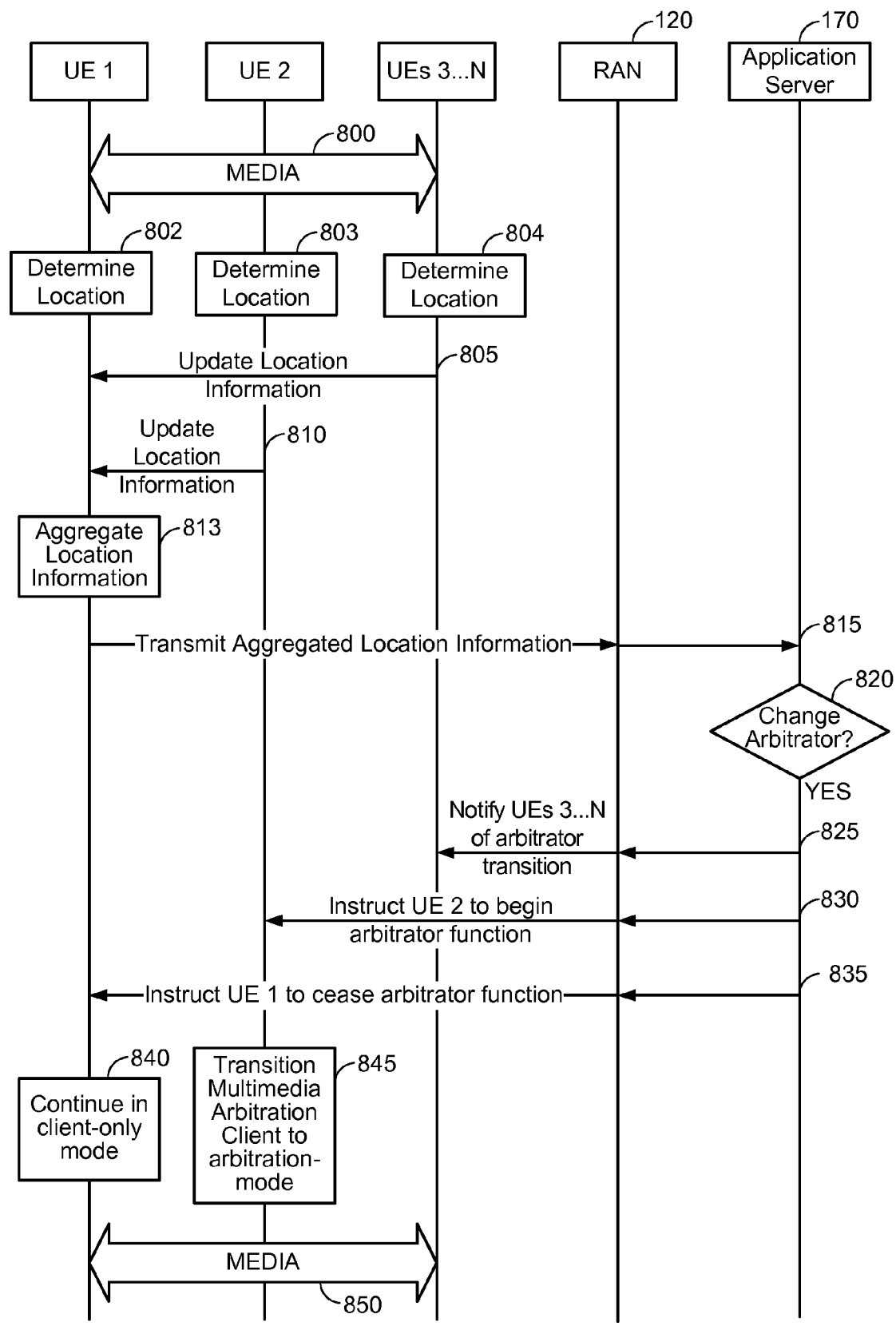
FIG. 8 illustrates a process of transitioning an arbitration function from a first UE to a second UE during any of the processes of FIGS. 5A through 7 in accordance with an embodiment of the invention.

Referring to FIG. 8, during any of the processes of FIGS. 5A through 7, assume that a group communication session is set-up at least between UEs 1 ... N via a PAN supported by WLAN protocols, with UE 1 being an initial arbitrator of the group communication session. Accordingly, media is being exchanged between UEs 1 ... N over the PAN within the first region 405A via WLAN protocols in 800. Next, during the group communication session, assume that UEs 1 ... N each determine their respective locations in an event-triggered or time-triggered (e.g., periodic) manner, 802, 803 and 804, and the non-arbitrator UEs (or UEs operating in client-only mode) transmit location-updates to the arbitrator or WWAN point-of contact for the communication session (i.e., UE 1), 805 and 810. The arbitrator of the communication session (i.e., UE 1, in FIG. 8) receives the location updates from UEs 2 ... N and then aggregates their reported location information of UEs 2 ... N into a message that also contains UE 1's location information, 813. UE 1 then transmits the message containing the aggregated location information of UEs 1 ... N over the WWAN to the application server 170, 815. The application server 170 receives the message from UE 1 determines whether to transition the arbitration function of the PAN in the first region 405A from UE 1 to another of UEs 2 ... N based on the aggregated location information of UEs 1 ... N contained in the aggregated message, 820. For example, if UE 1 is moving away from UEs 2 ... N while UEs 2 ... N remain relatively close together, the application server 170 may determine to transition the arbitration function to another of UEs 2 ... N (e.g., such as a geographically centrally located UE among UEs 2 ... N) in order to maintain the PAN. In the embodiment of FIG. 8, assume that the application server 170 determines to transition the arbitration function from UE 1 to UE 2 in 820. Accordingly, the application server 170 sends messages that notify UEs 1 ... N of the arbitrator transition, 825, that instruct UE 2 to begin acting as arbitrator, 830, and that instruct UE 1 to cease acting as arbitrator, 835. While a current arbitrator of a particular PAN typically functions as the sole WWAN point-of-contact for the application server 170 during the communication session, in 825 through 835, the application server 170 can send the arbitrator-transition notification to each of UEs 1 ... N because UE 1 cannot necessarily be relied upon for conveying the notification (e.g., UE 1 may moving away from the PAN and losing its connection thereto, etc.). Accordingly, UE 1 transitions to client-only mode, 840, and UE 2 transitions to arbitration-mode, 845. With UE 2 performing the arbitration function, media continues to be exchanged between UEs 1 ... N via a PAN supported by WLAN protocols, 850.

As noted above, FIGS. 5A through 8 are directed to a scenario where one or more of the UEs attempting to participate in the group communication session can access the WWAN and the application server 170. However, FIGS. 9A through 10 are directed to a scenario where the UEs attempting to participate in the group communication session cannot access the WWAN and/or the application server 170, and instead rely upon self-arbitration of the group communication session exclusively via a local wireless connection or PAN.

Referring to FIG. 9A, assume that UEs 1 ... N are each provisioned with a service set identifier (SSID) that is associated with a given communication group for locally arbitrated or PAN-based communication sessions, 900A, 905A and 910A. In particular, the same SSID is provisioned to each of UEs 1 ... N under the assumption that UEs 1 ... N are each associated with the same communication group. While not shown explicitly within FIG. 9A, the provisioning of the SSID to UEs 1 ... N can be performed based on a previous interaction (e.g., an initial registration procedure) between UEs 1 ... N and the application server 170 (i.e., while UEs 1 ... N still had WWAN-access). Also, while FIGS. 9A, 9B and 9C are described whereby SSIDs are used to distinguish between PAN-based group communication sessions, it will be appreciated that other types of identifiers may be used to achieve this function in other embodiments of the invention.

At some later point in time after the provisioning of 900A through 910A, UE 1 determines to initiate a group communication session to the other members of the given communication group (i.e., UEs 2 ... N), and thereby attempts to transmit a group call request message (or call message) to the RAN 120 to be forwarded to the application server 170, 915A. For example, the transmission attempt of 915A may be similar to the transmissions discussed above with respect to 510A of FIG. 5A and/or 510B of FIG. 5C. However, unlike 510A of FIG. 5A and/or 510B of FIG. 5C, assume that UE 1's attempt to transmit the group call request message in 915A is determined by UE 1 to have failed in 920A. For example, the failure of the transmission attempt 915A may be a result of excessive system interference, a distance to a closest Node B beyond too far to exchange a signal, the Node B having no available traffic channels for allocation to additional UEs, and so on. In an example, while not shown in FIG. 9A, UE 1 may repeat the attempt to transmit the group call request message a threshold number of times being concluding that the transmission has failed in 920A.

In the embodiment of FIG. 9A, after UE 1 determines that its attempt to transmit the group call request to the RAN 120 for setting up a WWAN-based group communication session has failed, UE 1 triggers a PAN-based call set-up procedure in an attempt to set-up the group communication session via a PAN in order to connect with at least a subset of the target communication group. Accordingly, after the failure determination of 920A, UE 1 begins to monitor a local PAN channel to determine whether the SSID provisioned to UE 1 at 900A for the given communication group is already being broadcasted, 925A. For example, the local PAN channel monitored at 925A can correspond to one or more WLAN channels, such that UE 1 scans the one or more WLAN channels to determine whether another UE in the communication group is already indicating its presence and a willingness to set-up a PAN-based group communication session. In an example, SSIDs can be set-up in advance to be broadcasted on a predetermined WLAN channel to reduce the time UEs need to search the WLAN channels to evaluate whether SSIDs are already being broadcast by other local UEs.

In 925A, assume that UE 1 determines that no other UEs in the given communication group that are in close proximity to UE 1 are broadcasting the SSID for the given group communication session. Accordingly, UE 1 sets-up or loads the multimedia arbitration client 305B for participating in the group communication session in the PAN via the WLAN protocols, 930A. After loading the multimedia WLAN arbitration client 305B in 930A, UE begins to periodically broadcast or transmit the SSID for the given communication group within the PAN via the WLAN protocols, 935A. In 935A, the broadcasted SSID functions to announce to any listening UEs within range of UE 1 that UE 1 wishes to set-up a PAN-based group communication session to the given communication group. Accordingly, while continuing to periodically transmit the SSID, UE 1 monitors for responses from one or more of the other group-members indicative of an acceptance the group communication session being announced by UE 1, 940A. In an example, the WLAN channel on which UE 1 monitors for responses can correspond to a predetermined WLAN channel such that UE 1 need only scan a subset of WLAN channels to determine whether responses are present, or alternatively UE 1 can scan a plurality of WLAN channels for responses in 940A.

At some later point in time, while UE 1 is periodically broadcasting the SSID via WLAN protocols over the PAN in 935A, assume that a user of UE 2 requests set-up of a group communication session to the given communication group, and thereby attempts to transmit a group call request message (or call message) to the RAN 120 to be forwarded to the application server 170, 945A. Similar to the group call request message transmission attempt by UE 1 at 915A, assume that UE 2's attempt to transmit the group call request message in 920A is determined by UE 2 to have failed in 950A.

Accordingly, after the failure determination of 950A, UE 2 begins to monitor a local PAN channel to determine whether the SSID provisioned to UE 2 at 905A for the given communication group is already being broadcasted, 955A. In this case, UE 2 determines that UE 1 is already broadcasting the SSID in 955A. As such, UE 2 refrains from broadcasting the SSID. Instead, UE 2 sets-up or loads its multimedia WLAN arbitration client 305B for participating in the group communication session in the PAN via the WLAN protocols, 958A. In an example, because UE 1 was the initial UE to attempt set-up of the group communication session and the UE that broadcasts the SSID, UE 1 may be set-up to operate in arbitration-mode whereas UE 2 is set-up to operate in client-only mode.

After loading the multimedia WLAN arbitration client 305B in 958A, UE 2 negotiates with UE 1 to establish their WLAN contact information for the group communication session, 960A. Likewise, UE 1 sends its own WLAN contact information to UE 2, 965A. After setting-up the WLAN contact information among UEs 1 and 2, UE 1 starts the group communication session as the initial floor-holder and begins transmitting media to UE 2 via WLAN protocols, 970A. As will be appreciated, the WWAN is bypassed and the media being exchanged in 970A corresponds to local WLAN (e.g., 802.11 or WiFi) traffic that is exchanged within the first region 405A between UEs 1 ... N. Also, the media exchanged in 970A can be directly conveyed from UE 1 to UE 2 without the use of a WLAN router or AP in an example. UE 2 receives the media from UE 1 and plays back the received media via respective audio output devices to its user, 975A.

FIGS. 9B and 9C are similar to FIG. 9A in some respects, although FIGS. 9B and 9C further illustrate a manner by which SSID-broadcast collisions can be resolved in accordance with an embodiment of the invention.

With respect to FIG. 9B, 900B through 924B substantially correspond to 900A through 930A of FIG. 9A, respectively, and as such will not be described further for the sake of brevity. During UE 1's PAN-based session set-up procedure occurring between 916B and 924B, assume that a user of UE 2 requests set-up of a group communication session to the given communication group, and thereby attempts to transmit a group call request message (or call message) to the RAN 120 to be forwarded to the application server 170, 928B. The transmission attempt by UE 2 in 928B is similar to UE 2's transmission attempt at 945A of FIG. 9A, except for the transmission attempt of 928B occurring when UE 1 is not yet broadcasting the SSID. Similar to 950A of FIG. 9A, assume that UE 2's attempt to transmit the group call request message in 928B is determined by UE 2 to have failed in 932B.

Accordingly, after the failure determination of 932B, UE 2 begins to monitor a local PAN channel to determine whether the SSID provisioned to UE 2 at 905B for the given communication group is already being broadcasted, 936B. In this case, UE 1 is not yet broadcasting the SSID, such that UE 2 determines that no other UEs in the given communication group are in close proximity to UE 2 are broadcasting the SSID for the given group communication session in 936B. Accordingly, UE 2 sets-up or loads the multimedia arbitration client 305B for participating in the group communication session in the PAN via the WLAN protocols, 940B.

Turning back to UE 1, after setting up the multimedia arbitration client 305B, UE 1 begins to transmit the SSID for the given communication group, 944B, and UE 1 then begins to monitor for responses to the broadcasted SSID from local group-members, 948B, as discussed above with respect to 935A and 940A of FIG. 9A, respectively.

Next, after UE 1 begins transmitting the SSID via WLAN protocols within the PAN, assume that a user of UE 3 requests set-up of a group communication session to the given communication group, and thereby attempts to transmit a group call request message (or call message) to the RAN 120 to be forwarded to the application server 170 (not shown), and that UE 3 determines the transmission attempt to have failed in 952B.

After the failure determination of 952B, UE 3 begins to monitor a local PAN channel to determine whether the SSID provisioned to UE 3 at 908B for the given communication group is already being broadcasted, 956B. In this case, UE 3 determines that UE 1 is already broadcasting the SSID in 956B. As such, UE 3 refrains from broadcasting the SSID. Instead, UE 3 sets-up or loads its multimedia WLAN arbitration client 305B for participating in the group communication session in the PAN via the WLAN protocols, 958B. In an example, because UE 1 was the initial UE to attempt set-up of the group communication session and the UE that broadcasts the SSID, UE 1 may be set-up to operate in arbitration-mode whereas UE 3 is set-up to operate in client-only mode.

Turning to FIG. 9C, after loading the multimedia WLAN arbitration client 305B in 958B, UE 3 negotiates with UE 1 to establish its WLAN contact information for the group communication session, 960B. Likewise, UE 1 sends its own WLAN contact information to UE 3, 964B.

Turning back to UE 2, after setting-up the multimedia arbitration client 305B in 940B, because UE 2 did not detect the SSID broadcast of UE 1, UE 2 begins transmitting the SSID via WLAN protocols within the PAN, 968B, and then monitors for SSID-responses from local group members in 972B.

At this point, both UEs 1 and 2 are broadcasting the SSID while also monitoring for SSID responses. Accordingly, due to the monitoring of the WLAN channels at the respective UEs, UEs 1 and 2 each detect the SSID-broadcast collision in 976B and 980B. In the embodiment of FIG. 9C, in addition to the SSID being provisioned to UEs 1 ... N in 900B, 905B and 910B, assume that UEs 1 ... N are also each provisioned with a SSID-broadcast collision resolution protocol. For example, each SSID that is broadcasted by UEs 1 and 2 may include a timestamp that indicates the time at which the initial SSID broadcast was made. In this case, the SSID-broadcast collision resolution protocol may be for the UE transmitting the SSID with an earlier timestamp to become the arbitrator while any UE transmitting an SSID with a later timestamp reverts to client-only mode and stops transmitting the SSID. As will be appreciated, other embodiments can be directed to different SSID-broadcast collision resolution protocols. For example, each successive SSID broadcasted by the UEs may have an incremented sequence number, with the SSID-broadcast collision resolution protocol configured to designate a UE transmitting a SSID associated with a highest sequence number as the arbitrator, and so on.

The timestamp example is illustrated in FIG. 9C such that UE 1 (i.e., the earlier SSID broadcaster) uses the respective SSID-timestamps to determine to maintain itself as arbitrator in 982B and UE 2 (i.e., the later SID broadcaster) uses the respective SSID-timestamps to determine that UE 1 (and not UE 2) will continue as arbitrator for the group communication session, 984B. UE 2 thereby stops broadcasting the SSID and thereafter continues to participating in the group communication session in client-only mode, 986B.

Referring to FIG. 9C, UE 2 negotiates with UE 1 to establish its WLAN contact information for the group communication session, 988B, and UE 1 sends its own WLAN contact information to UE 2, 990B. After setting-up the WLAN contact information among UEs 1 and 3, UE 1 starts the group communication session as the initial floor-holder and begins transmitting media to UEs 2 and 3 via WLAN protocols, 992B. It will be appreciated that the media transmission shown in 992B may be a continuation of an earlier transmission if UE 1 had already begun transmitting to UE 3 after 964B, in an example. UEs 2 and 3 receive the media from UE 1 and playback the received media via respective audio output devices to its user, 994B.

During any of the PAN-supported group communication sessions described above with respect to FIGS. 9A, 9B and 9C, the identity of the arbitrator can be transitioned to another UE. In the example described below with respect to FIG. 10, an arbitrator transition is triggered based on the location of another UE in the same PAN as the arbitrator and participating in the group communication session becoming more suitable for executing the arbitration function as compared to the initial arbitrator. FIG. 10 is similar in some respects to FIG. 8. However, the arbitrator-transition in FIG. 8 is mediated in part by the application server 170 via the WWAN, whereas the arbitrator-transition of FIG. 10 is determined within the existing PAN by the current arbitrator.

Referring to FIG. 10, during the process of FIG. 9A, FIG. 9B and/or FIG. 9C, assume that a group communication session is set-up at least between UEs 1 . . . N via a PAN supported by WLAN protocols, with UE 1 being an initial arbitrator of the group communication session. Accordingly, media is being exchanged between UEs 1 . . . N over the PAN within the first region 405A via WLAN protocols in 1000. Next, during the group communication session, assume that UEs 1 . . . N each determine their respective locations in an event-triggered or time-triggered (e.g., periodic) manner, 1005, 1010 and 1015, and then UEs 2 . . . N each transmit location-updates to the local arbitrator of the PAN supported communication session (i.e., UE 1), 1020 and 1025. UE 1 receives the location-updates from UEs 2 . . . N and determines whether to transition the arbitration function of the PAN in the first region 405A from UE 1 to another of UEs 2 . . . N. For example, if UE 1 is moving away from UEs 2 . . . N while UEs 2 . . . N remain relatively close together, UE 1 may determine to transition the arbitration function to another of UEs 2 . . . N (e.g., such as a geographically centrally located UE among UEs 2 . . . N) in order to maintain the PAN. In the embodiment of FIG. 10, assume that UE 1 determines to transition the arbitration function from UE 1 to UE 2 in 1030. Accordingly, UE 1 sends a message to UE 2 that authorizes UE 2 to transition from client-only mode into arbitrator-mode, 1035, and UE 1 also notifies UEs 3 . . . N with regard to the arbitrator transition, 1040. Accordingly, UE 1 transitions to client-only mode, 1045, and UE 2 transitions to arbitration-mode, 1050. With UE 2 performing the arbitration function, media continues to be exchanged between UEs 1 . . . N via a PAN supported by WLAN protocols, 1055.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of establishing a group communication session at an application server, comprising:
   receiving, from an originating wireless subscriber device, a request to initiate the group communication session over a Wireless Wide Area Network (WWAN) with a communication group that includes three or more group members;
   announcing the group communication session to the communication group;
   obtaining location information associated with the originating wireless subscriber device and a first set of wireless subscriber devices from the communication group, the first set of wireless subscriber devices corresponding to group members that accepted the announcement of the group communication session;
   determining, based on the obtained location information, that the group communication session between the originating wireless subscriber device and the first set of wireless subscriber devices can be supported via a first Personal Area Network (PAN); and
   transitioning, based on the determination, the group communication session to a PAN-based group communication session, wherein at least a portion of media exchanged during the group communication session occurs via the first PAN.

2. The method of claim 1, wherein the originating wireless subscriber device begins the PAN-based group communication session as an initial floor-holder.

3. The method of claim 1, wherein the group communication session corresponds to a half-duplex push-to-talk (PTT) session.

4. The method of claim 1, further comprising:
   receiving a floor request configured to request a floor transition to a session-participant of the PAN-based group communication session; and
   selectively granting the floor to the session-participant.

5. The method of claim 1, further comprising:
   determining that a second set of wireless subscriber devices requesting to join the group communication session cannot join the first PAN.

6. The method of claim 5, further comprising:
   extending support of the group communication session to the second set of wireless subscriber devices via WWAN-protocols.

7. The method of claim 6, wherein the extending support step includes:
   sending a message to a given wireless subscriber device within the first PAN to request that media transmitted by a current floor-holder of the group communication session within the first PAN be simulcasted to the application server;
   receiving the simulcasted media; and
   transmitting the simulcasted media to the second set of wireless subscriber devices.

8. The method of claim 7, wherein the given wireless subscriber device corresponds to an arbitrator of the first PAN or point-of-contact between the application server and the first PAN over the WWAN.

9. The method of claim 7,
   wherein the current floor-holder is the given wireless subscriber device;
   wherein the simulcasted media is received from the given wireless subscriber device.

10. The method of claim 7,
    wherein the current floor-holder is not the given wireless subscriber device;
    wherein the simulcasted media is received from the given wireless subscriber device.

11. The method of claim 6, further comprising:
    obtaining additional location information associated with the second set of wireless subscriber devices; and
    determining, based on the obtained additional location information associated with the second set of wireless subscriber devices, that the group communication session between the second set of wireless subscriber devices can be supported via a second PAN.

12. The method of claim 11, wherein the extending support step includes:
    transitioning of the second set of wireless subscriber devices into the second PAN; and
    receiving simulcasted media that originates from a current floor-holder within the first PAN; and
    transmitting the simulcasted media to a given wireless subscriber device within the second PAN,
    wherein the application server relies upon the given wireless subscriber device within the second PAN to share the simulcasted media with one or more other of the second set of wireless subscriber devices.

13. The method of claim 12, wherein the given wireless subscriber device corresponds to an arbitrator of the second PAN or point-of-contact between the application server and the second PAN over the WWAN.

14. The method of claim 1, wherein the PAN is based upon Wireless Local Area Network (WLAN) or IEEE 802.11a/b/g/n protocols.

15. The method of claim 1, further comprising:
designating a first wireless subscriber device to be an arbitrator that performs an arbitration function within the first PAN, wherein the arbitrator functions as a point of contact between the application server and the first PAN over the WWAN.

16. The method of claim 15, further comprising:
determining to transition the arbitration function for the first PAN from the first wireless subscriber device to a second wireless subscriber device; and
designating the second wireless subscriber device to be the arbitrator within the first PAN based on the determination.

17. The method of claim 16, wherein the designating step includes:
transmitting, from the application server over the WWAN, an arbitrator-transition notification to each wireless subscriber device within the first PAN, the arbitrator-transition notification indicating that the arbitration function is transitioned from the first wireless subscriber device to the second wireless subscriber device.

18. The method of claim 16, further comprising:
receiving location information indicative of geographic positions of the originating wireless subscriber device and the first set of wireless subscriber devices,
wherein the determination to transition the arbitration function is based upon the received location information.

19. The method of claim 18, wherein the received location information that is indicative of geographic positions of the originating wireless subscriber device and the first set of wireless subscriber devices is received from the first wireless subscriber device.

20. The method of claim 18, wherein the determination to transition the arbitration function from the first wireless subscriber device to the second wireless subscriber device is based upon the received location information indicating that the second wireless subscriber device is more geographically central to the first PAN as compared to the first wireless subscriber device.

21. A method of establishing a group communication session, comprising:
determining, at an originating wireless subscriber device, that an attempt to initiate the group communication session over a Wireless Wide Area Network (WWAN) with a communication group that includes three or more group members has failed;
periodically broadcasting, based on the determining step, a local signal that is configured to indicate, to the communication group, that the originating wireless subscriber device is attempting to initiate the group communication session over a Personal Area Network (PAN);
receiving at least one session acceptance message of the periodically broadcasted local signal from at least one of a plurality of target wireless subscriber devices that belongs to the communication group;
setting up the group communication session over the PAN between the originating wireless subscriber device and the at least one target wireless subscriber device; and
exchanging media over the PAN between the originating wireless subscriber device and the at least one target wireless subscriber device.

22. The method of claim 21, wherein the PAN is based upon Wireless Local Area Network (WLAN) or IEEE 802.11a/b/g/n protocols.

23. The method of claim 21, wherein the periodically broadcasted local signal includes an identifier that identifies the communication group.

24. The method of claim 23, wherein the identifier is a service set identifier (SSID).

25. The method of claim 23, wherein the originating wireless subscriber device is provisioned with the identifier prior to the determining step by an application server via the WWAN.

26. The method of claim 21, further comprising:
after the determining step, monitoring to detect whether any members of the communication group are already broadcasting the local signal,
wherein the originating wireless subscriber device performs the periodically broadcasting step selectively based upon the monitoring step failing to detect any members of the communication group broadcasting the local signal.

27. The method of claim 21, wherein the periodically broadcasted local signal is configured to include collision resolution information to be used to select an arbitrator of the group communication session over the PAN in the event that multiple wireless subscriber devices are concurrently broadcasting the local signal.

28. The method of claim 27, wherein the collision resolution information corresponds to a timestamp of an initial periodic transmission of the local signal by a respective wireless subscriber device.

29. The method of claim 28, wherein the monitoring step detects that another member of the communication group is already periodically broadcasting the local signal, further comprising:
comparing the timestamp of the other member's local signal to the timestamp of the timestamp of the local signal broadcasted by the originating wireless subscriber device;
permitting the other member to be the arbitrator of the group communication session over the PAN if the comparison indicates that the timestamp of the other member's local signal is earlier than the timestamp of the local signal that is periodically broadcasted by the originating wireless subscriber device; and
participating as the arbitrator of the group communication session over the PAN if the comparison indicates that the timestamp of the other member's local signal is later than the timestamp of the local signal that is periodically broadcasted by the originating wireless subscriber device.

30. The method of claim 21, wherein the originating wireless subscriber device is an initial arbitrator that performs an arbitration function for the group communication session, further comprising:
determining to transition the arbitration function from the originating wireless subscriber device to another wireless subscriber device; and
designating the other wireless subscriber device to be a new arbitrator for the group communication session based on the determining to transition step.

31. The method of claim 30, further comprising:
determining location information indicative of a geographic position of the originating wireless device;
receiving location information indicative of geographic positions of the at least one target wireless subscriber device,
wherein the determination to transition the arbitration function is based upon the determined location information and the received location information.

32. The method of claim 31, wherein the determination to transition the arbitration function from the originating wireless subscriber device to the other wireless subscriber device is based upon the determined and received location information indicating that the other wireless subscriber device is more geographically central to the PAN as compared to the originating wireless subscriber device.

33. A method of establishing a group communication session, comprising:
determining, at a given wireless subscriber device, that a given attempt to initiate the group communication session over a Wireless Wide Area Network (WWAN) with a communication group that includes three or more group members has failed;
monitoring, based upon the determination, to detect whether any other group members are already periodically broadcasting a local signal, the local signal configured to announce an attempt to initiate the group communication session over a Personal Area Network (PAN);
detecting, based on the monitoring step, that at least one of a plurality of wireless subscriber devices that belongs to the communication group is already periodically broadcasting the local signal;
refraining from periodically broadcasting the local signal based upon the detection;
setting up the group communication session over the PAN between the given wireless subscriber device and the at least one wireless subscriber device; and
exchanging media over the PAN between the given wireless subscriber device and the at least one wireless subscriber device.

34. The method of claim 33, wherein the PAN is based upon Wireless Local Area Network (WLAN) or IEEE 802.11a/b/g/n protocols.

35. The method of claim 33, wherein the local signal includes an identifier that identifies the communication group.

36. The method of claim 35, wherein the identifier is a service set identifier (SSID).

37. The method of claim 35, wherein the given wireless subscriber device is provisioned with the identifier prior to the determining step by an application server via the WWAN.

38. An application server configured to establish a group communication session, comprising:
means for receiving, from an originating wireless subscriber device, a request to initiate the group communication session over a Wireless Wide Area Network (WWAN) with a communication group that includes three or more group members;
means for announcing the group communication session to the communication group;
means for obtaining location information associated with the originating wireless subscriber device and a first set of wireless subscriber devices from the communication group, the first set of wireless subscriber devices corresponding to group members that accepted the announcement of the group communication session;
means for determining, based on the obtained location information, that the group communication session between the originating wireless subscriber device and the first set of wireless subscriber devices can be supported via a first Personal Area Network (PAN); and
means for transitioning, based on the determination, the group communication session to a PAN-based group communication session, wherein at least a portion of media exchanged during the group communication session occurs via the first PAN.

39. An originating wireless subscriber device configured to establishing a group communication session, comprising:
means for determining that an attempt to initiate the group communication session over a Wireless Wide Area Network (WWAN) with a communication group that includes three or more group members has failed;
means for periodically broadcasting, based on the determination, a local signal that is configured to indicate, to the communication group, that the originating wireless subscriber device is attempting to initiate the group communication session over a Personal Area Network (PAN);
means for receiving at least one session acceptance message of the periodically broadcasted local signal from at least one of a plurality of target wireless subscriber devices that belongs to the communication group;
means for setting up the group communication session over the PAN between the originating wireless subscriber device and the at least one target wireless subscriber device; and
means for exchanging media over the PAN between the originating wireless subscriber device and the at least one target wireless subscriber device.

40. A given wireless subscriber device configured to establish a group communication session, comprising:
means for determining that a given attempt to initiate the group communication session over a Wireless Wide Area Network (WWAN) with a communication group that includes three or more group members has failed;
means for monitoring, based upon the determination, to detect whether any other group members are already periodically broadcasting a local signal, the local signal configured to announce an attempt to initiate the group communication session over a Personal Area Network (PAN);
means for detecting, based on the monitoring, that at least one of a plurality of wireless subscriber devices that belongs to the communication group is already periodically broadcasting the local signal;
means for refraining from periodically broadcasting the local signal based upon the detection;
means for setting up the group communication session over the PAN between the given wireless subscriber device and the at least one wireless subscriber device; and
means for exchanging media over the PAN between the given wireless subscriber device and the at least one wireless subscriber device.

41. An application server configured to establish a group communication session, comprising:
a processor operatively coupled to memory and configured to:
receive, from an originating wireless subscriber device, a request to initiate the group communication session over a Wireless Wide Area Network (WWAN) with a communication group that includes three or more group members;
announce the group communication session to the communication group;
obtain location information associated with the originating wireless subscriber device and a first set of wireless subscriber devices from the communication group, the first set of wireless subscriber devices corresponding to group members that accepted the announcement of the group communication session;

determine, based on the obtained location information, that the group communication session between the originating wireless subscriber device and the first set of wireless subscriber devices can be supported via a first Personal Area Network (PAN); and transition, based on the determination, the group communication session to a PAN-based group communication session, wherein at least a portion of media exchanged during the group communication session occurs via the first PAN.

42. An originating wireless subscriber device configured to establishing a group communication session, comprising:

a processor operatively coupled to memory and configured to:

determine that an attempt to initiate the group communication session over a Wireless Wide Area Network (WWAN) with a communication group that includes three or more group members has failed;

periodically broadcast, based on the determination, a local signal that is configured to indicate, to the communication group, that the originating wireless subscriber device is attempting to initiate the group communication session over a Personal Area Network (PAN);

receive at least one session acceptance message of the periodically broadcasted local signal from at least one of a plurality of target wireless subscriber devices that belongs to the communication group;

set up the group communication session over the PAN between the originating wireless subscriber device and the at least one target wireless subscriber device; and exchange media over the PAN between the originating wireless subscriber device and the at least one target wireless subscriber device.

43. A given wireless subscriber device configured to establish a group communication session, comprising:

a processor operatively coupled to memory and configured to:

determine that a given attempt to initiate the group communication session over a Wireless Wide Area Network (WWAN) with a communication group that includes three or more group members has failed;

monitor, based upon the determination, to detect whether any other group members are already periodically broadcasting a local signal, the local signal configured to announce an attempt to initiate the group communication session over a Personal Area Network (PAN);

detect, based on the monitoring, that at least one of a plurality of wireless subscriber devices that belongs to the communication group is already periodically broadcasting the local signal;

refrain from periodically broadcasting the local signal based upon the detection;

set up the group communication session over the PAN between the given wireless subscriber device and the at least one wireless subscriber device; and exchange media over the PAN between the given wireless subscriber device and the at least one wireless subscriber device.

44. A non-transitory computer-readable storage medium containing instructions stored thereon, which, when executed by an application server configured to establish a group communication session, cause the application server to perform actions, the instructions comprising:

program code to receive, from an originating wireless subscriber device, a request to initiate the group communication session over a Wireless Wide Area Network (WWAN) with a communication group that includes three or more group members;

program code to announce the group communication session to the communication group;

program code to obtain location information associated with the originating wireless subscriber device and a first set of wireless subscriber devices from the communication group, the first set of wireless subscriber devices corresponding to group members that accepted the announcement of the group communication session;

program code to determine, based on the obtained location information, that the group communication session between the originating wireless subscriber device and the first set of wireless subscriber devices can be supported via a first Personal Area Network (PAN); and program code to transition, based on the determination, the group communication session to a PAN-based group communication session, wherein at least a portion of media exchanged during the group communication session occurs via the first PAN.

45. A non-transitory computer-readable storage medium containing instructions stored thereon, which, when executed by an originating wireless subscriber device configured to establishing a group communication session, cause the originating wireless subscriber device to perform actions, the instructions comprising:

program code to determine that an attempt to initiate the group communication session over a Wireless Wide Area Network (WWAN) with a communication group that includes three or more group members has failed;

program code to periodically broadcast, based on the determination, a local signal that is configured to indicate, to the communication group, that the originating wireless subscriber device is attempting to initiate the group communication session over a Personal Area Network (PAN);

program code to receive at least one session acceptance message of the periodically broadcasted local signal from at least one of a plurality of target wireless subscriber devices that belongs to the communication group;

program code to set up the group communication session over the PAN between the originating wireless subscriber device and the at least one target wireless subscriber device; and program code to exchange media over the PAN between the originating wireless subscriber device and the at least one target wireless subscriber device.

46. A non-transitory computer-readable storage medium containing instructions stored thereon, which, when executed by a given wireless subscriber device configured to establishing a group communication session, cause the given wireless subscriber device to perform actions, the instructions comprising:

program code to determine that a given attempt to initiate the group communication session over a Wireless Wide Area Network (WWAN) with a communication group that includes three or more group members has failed;

program code to monitor, based upon the determination, to detect whether any other group members are already periodically broadcasting a local signal, the local signal configured to announce an attempt to initiate the group communication session over a Personal Area Network (PAN);

program code to detect, based on the monitoring, that at least one of a plurality of wireless subscriber devices that belongs to the communication group is already periodically broadcasting the local signal;

program code to refrain from periodically broadcasting the local signal based upon the detection;

program code to set up the group communication session over the PAN between the given wireless subscriber device and the at least one wireless subscriber device; and program code to exchange media over the PAN between the given wireless subscriber device and the at least one wireless subscriber device.

\* \* \* \* \*

UNITED STATES PATENT AND TRADEMARK OFFICE
CERTIFICATE OF CORRECTION

| | |
|---|---|
| PATENT NO. | : 8,654,686 B2 |
| APPLICATION NO. | : 13/108245 |
| DATED | : February 18, 2014 |
| INVENTOR(S) | : Kirankumar Anchan |

It is certified that error appears in the above-identified patent and that said Letters Patent is hereby corrected as shown below:

In the Specification

On Col. 8, line 43:
    Delete the phrase "a multimedia arbitration client 305B" and
    Insert -- a multimedia WLAN arbitration client 305B --

On Column 14, line 36:
    Delete "615B" and
    Insert -- 615A --

On Col. 19, lines 62-63:
    Delete the phrase "a multimedia arbitration client 305B" and
    Insert -- a multimedia WLAN arbitration client 305B --

On Col. 20, lines 16-17:
    Delete the phrase "a multimedia arbitration client 305B" and
    Insert -- a multimedia WLAN arbitration client 305B --

On Col. 20, lines 19-20:
    Delete the phrase "a multimedia arbitration client 305B" and
    Insert -- a multimedia WLAN arbitration client 305B --

On Column 21, line 15:
    Delete "SID" and
    Insert -- SSID --

In the Claims

On Column 26, line 34:
    Delete the phrase "of the timestamp"

Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,654,686 B2

On Column 26, line 34:
        Delete the phrase "originating wireless device" and
        Insert -- originating wireless subscriber device --